US009995357B2

(12) United States Patent
Miyazaki

(10) Patent No.: US 9,995,357 B2
(45) Date of Patent: Jun. 12, 2018

(54) ANNULAR SPRING, AND TORQUE DETECTING DEVICE AND ROBOT JOINT MECHANISM USING THE ANNULAR SPRING

(71) Applicant: HONDA MOTOR CO., LTD., Tokyo (JP)

(72) Inventor: Susumu Miyazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 14/931,054

(22) Filed: Nov. 3, 2015

(65) Prior Publication Data
US 2016/0131216 A1    May 12, 2016

(30) Foreign Application Priority Data
Nov. 12, 2014  (JP) .................................. 2014-229996

(51) Int. Cl.
| | | |
|---|---|---|
| *F16F 1/14* | (2006.01) | |
| *B25J 17/02* | (2006.01) | |
| *G01L 3/14* | (2006.01) | |
| *B25J 13/08* | (2006.01) | |
| *B25J 19/00* | (2006.01) | |

(52) U.S. Cl.
CPC .............. *F16F 1/14* (2013.01); *B25J 13/085* (2013.01); *B25J 17/0208* (2013.01); *B25J 17/0241* (2013.01); *B25J 19/0091* (2013.01); *G01L 3/1407* (2013.01)

(58) Field of Classification Search
CPC .. F16F 1/324; F16F 1/34; F16F 1/3732; F16F 1/027
See application file for complete search history.

(56) References Cited

U.S. PATENT DOCUMENTS

| | | | | |
|---|---|---|---|---|
| 2,947,529 A | * | 8/1960 | Schwartz ................. | F16F 1/32 267/161 |
| 3,598,389 A | * | 8/1971 | Kohler ..................... | F16K 15/08 267/161 |
| 3,602,490 A | * | 8/1971 | Mueller ................. | G01V 1/181 267/161 |
| 3,788,099 A | * | 1/1974 | Miller ...................... | F16D 3/78 192/200 |

(Continued)

FOREIGN PATENT DOCUMENTS

JP            4801534        8/2011

*Primary Examiner* — Harshad R Patel
*Assistant Examiner* — Tran M Tran
(74) *Attorney, Agent, or Firm* — Rankin, Hill & Clark LLP

(57) ABSTRACT

An elastic section 13 is configured by a first elastic section 13a that has one end connected to an outer circumferential surface of an inner circumferential section 12, and the other end connected to an inner circumferential surface of an outer circumferential section 11, and a second elastic section 13b that is symmetrical to the first elastic section 13a about a line that passes through a center point P1 of the inner circumferential section 12 and a connection point P2 of the inner circumferential section 12 and the first elastic section 13a. When the outer circumferential section 11 and the inner circumferential section 12 relatively rotate, the first elastic section 13a and the second elastic section 13b are elastically deformed in such a manner that one is compressed and the other is stretched.

12 Claims, 11 Drawing Sheets

(56) References Cited

U.S. PATENT DOCUMENTS

| | | | | |
|---|---|---|---|---|
| 4,238,845 A * | 12/1980 | Haggard | G01V 1/181 | 267/161 |
| 4,323,994 A * | 4/1982 | Coogler | G01V 1/181 | 267/158 |
| 4,704,041 A * | 11/1987 | Hayashi | F16F 1/324 | 101/93.05 |
| 5,269,499 A * | 12/1993 | Schwab | F16F 1/322 | 200/290 |
| 5,492,313 A * | 2/1996 | Pan | F16F 1/025 | 267/161 |
| 5,555,222 A * | 9/1996 | Woo | G01V 1/181 | 267/161 |
| 5,709,516 A * | 1/1998 | Peterson | F16F 1/324 | 267/162 |
| 6,286,650 B1 * | 9/2001 | Tabuchi | F16F 27/112 | 192/84.94 |
| 6,306,043 B1 * | 10/2001 | Annic | F16F 15/13492 | 192/213.2 |
| 6,983,924 B2 * | 1/2006 | Howell | F16F 1/027 | 251/118 |
| 7,338,398 B2 * | 3/2008 | Whiting | F16F 1/324 | 267/161 |
| 7,354,032 B2 * | 4/2008 | Buchhagen | F16F 1/324 | 267/160 |
| 7,819,132 B2 * | 10/2010 | Etheridge | F16K 15/046 | 137/539 |
| 8,089,199 B2 * | 1/2012 | Shu | F16D 3/79 | 310/328 |
| 8,176,809 B2 * | 5/2012 | Ihrke | B25J 17/0241 | 267/161 |
| 8,246,023 B2 * | 8/2012 | Cappeller | F04B 39/0044 | 248/593 |
| 8,356,577 B2 * | 1/2013 | Van Den Berg | A01J 5/007 | 119/14.01 |
| 8,511,339 B2 * | 8/2013 | Kim | F02M 37/0029 | 137/535 |
| 8,876,094 B1 * | 11/2014 | Ridgeway | F16F 1/34 | 267/160 |
| 8,931,608 B2 * | 1/2015 | Lindemann | F16F 15/1292 | 192/214 |
| 9,086,101 B2 * | 7/2015 | Zhu | F16F 1/027 | |
| 9,206,807 B2 * | 12/2015 | Li | F16F 1/324 | |
| 9,217,476 B2 * | 12/2015 | Roby | F16D 27/11 | |
| 9,273,749 B2 * | 3/2016 | Goold | F16F 13/00 | |
| 9,285,073 B2 * | 3/2016 | Ellis | F16F 1/324 | |
| 9,382,942 B2 * | 7/2016 | Sakon | F16C 35/063 | |
| 9,488,239 B2 * | 11/2016 | Valembois | F16F 1/025 | |
| 9,523,393 B2 * | 12/2016 | Roby | F16D 27/11 | |
| 2008/0075561 A1 * | 3/2008 | Takemura | F16F 1/025 | 414/2 |
| 2010/0002977 A1 * | 1/2010 | Saenz De Ugarte | F16C 27/04 | 384/581 |
| 2014/0008557 A1 * | 1/2014 | Vandamme | F16F 1/027 | 251/129.15 |
| 2014/0158492 A1 * | 6/2014 | Roby | F16D 27/11 | 192/66.31 |
| 2016/0107322 A1 * | 4/2016 | Miyazaki | B25J 19/0091 | 74/640 |

\* cited by examiner

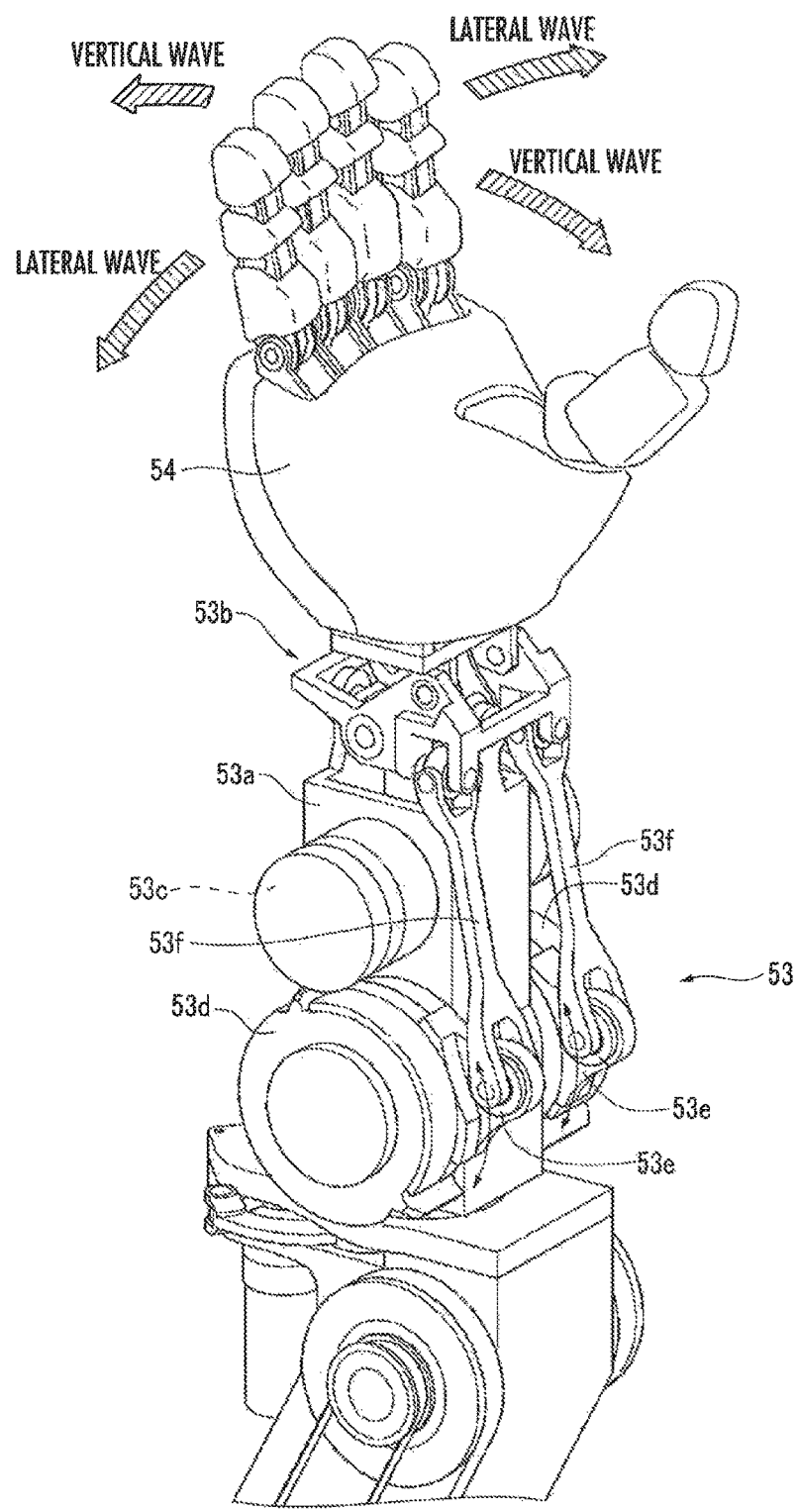

ANNULAR SPRING, AND TORQUE DETECTING DEVICE AND ROBOT JOINT MECHANISM USING THE ANNULAR SPRING

BACKGROUND OF THE INVENTION

Field of the Invention

The present invention relates to an annular spring that transmits a rotational drive force that is transmitted to one of an inner circumferential section and an outer circumferential section to the other one, and a torque detecting device and a robot joint mechanism using the annular spring.

Description of the Related Art

There has been conventionally known a robot comprising a base body as a trunk, a head section that is provided on an upper portion of the base body, left and right arm bodies that are provided extendedly from both left and right sides of the upper portion of the base body, hand sections that are provided at tip end portions of the arm bodies, left and right leg bodies that are extendedly provided downward from a lower portion of the base body, and foot sections that are attached to tip end portions of the leg bodies, similarly to a human being. A robot of this kind can perform bending and stretching movements of the arm bodies and the leg bodies in a plurality of joint mechanisms corresponding to joints such as shoulder joints, elbow joins, wrist joints, hip joints, knee joints, and ankle joints of a human being.

As the joint mechanism which is used to enable the bending and stretching movements as above, there is a joint mechanism comprising a drive source such as an actuator, an annular spring to which a drive force is transmitted from a reduction mechanism, and a link mechanism that has the drive force transmitted from the annular spring and causes the respective sections of a robot to perform bending and stretching movements.

As the annular spring, there is an annular spring that has an annular outer circumferential section, an annular inner circumferential section that is disposed on an inner circumferential side of the outer circumferential section, and an elastic section that is disposed between the outer circumferential section and the inner circumferential section. As the elastic section of the annular spring like this, there are an elastic section that is in a cantilever shape where bending stress is generated when the outer circumferential section and the inner circumferential section relatively rotate and a load is applied thereto, and an elastic section that is in a shape of a torsion bar where torsional stress is generated, (refer to Japanese Patent No. 4801534, for example).

In the joint mechanisms which are configured as above, the elastic sections of the annular springs absorb impacts at the time of the arm bodies and leg bodies to be bent and stretched contacting or colliding with obstacles or the like, and thereby protect the joint mechanisms. Further, in the joint mechanisms as above, deformation degrees of components of the annular springs are measured, and the rotational drive forces (torque) which are transmitted are calculated based on the detection values.

SUMMARY OF THE INVENTION

However, the conventional annular springs use the components where bending stress and torsional stress are generated when loads are applied thereto, as the elastic sections. Consequently, when the magnitude of the displacement amount in the relative rotational direction of the outer circumferential section and the inner circumferential section are to be made a value which is sufficient to absorb an impact, the length in the axial direction and the radius have to be made large, and there has been the problem that reduction in size and weight is difficult.

The present invention is made in the light of the above point, and has an object to provide a compact and light annular spring that easily absorbs an impact, and a torque detecting device and a robot joint mechanism that use the annular spring.

In order to achieve the above described object, an annular spring of the present invention is an annular spring comprising an annular outer circumferential section, an annular inner circumferential section that is disposed on an inner circumferential side of the outer circumferential section, and an elastic section that is disposed between the outer circumferential section and the inner circumferential section, wherein the elastic section is configured by a first elastic section that has one end connected to an outer circumferential surface of the inner circumferential section, and the other end connected to an inner circumferential surface of the outer circumferential section, and a second elastic section that has one end connected to the outer circumferential surface of the inner circumferential section, and the other end connected to the inner circumferential surface of the outer circumferential section, and is symmetrical to the first elastic section about a line that passes through a center point of the inner circumferential section and a connection point of the inner circumferential section and the first elastic section, and when either one of the outer circumferential section or the inner circumferential section rotates relatively to the other one, the first elastic section and the second elastic section are elastically deformed in such a manner that either one of the first elastic section and the second elastic section is compressed, and the other one is stretched.

According to the present invention, when an outer circumferential member and an inner circumferential member relatively rotate and a load is applied, the first elastic section and the second elastic section which configure the elastic section of the annular spring generate compressive stress or tensile stress. The annular spring of the present invention comprises the elastic section like this, and therefore, can increase a displacement amount in the relative rotational direction of the outer circumferential section and the inner circumferential section, and absorb an impact more easily, as compared with the conventional elastic section which generate bending stress and torsional stress when a load is applied thereto. Further, in the annular spring of the present invention, a length in the axial direction and a radius do not become larger and a weight does not become larger as compared with the conventional annular spring, even though the displacement amount is increased like this.

Further, the first elastic section and the second elastic section are disposed to be symmetrical about the line. When the force in the same direction is applied, the first elastic section and the second elastic section are compressed and stretched in the opposite directions, and therefore, the tensile load and the compressive load that are applied to each of them are symmetrical about the center point of the inner circumferential section as the entire elastic section. Consequently, in the annular spring of the present invention, a deviation of the center of the outer circumferential section and the center of the inner circumferential section hardly occur, hysteresis of deformation hardly occurs, and therefore, when sensing is performed with use of a strain sensor or the like, reliability of the sensing is high.

Further, in the annular spring of the present invention, it is preferable that the outer circumferential section or the inner circumferential section has a connection section that is connected to the elastic section, the elastic section and the outer circumferential section or the inner circumferential section are integrally formed, and a section of the connection section, which is sandwiched by the elastic section and the inner circumferential surface of the outer circumferential section or the outer circumferential surface of the inner circumferential section is in a shape that is recessed into an arc shape toward a side of the connection point of the elastic section and the outer circumferential section or the inner circumferential section.

If the section which is sandwiched by the elastic section, and the inner circumferential surface of the outer circumferential section or the outer circumferential surface of the inner circumferential section is formed into the arc shape, the force which is applied to the connection section when a load is applied to the annular spring is dispersed, and an allowable load is increased. That is, breakage in that section hardly occurs. Therefore, the life of the annular spring can be elongated, and the annular spring can be reduced in size and weight.

Further, the annular spring of the present invention preferably comprises an even number of the elastic sections.

If the annular spring comprises a plurality of the elastic sections (that is, a plurality of sets of the first elastic sections and the second elastic sections), at the time of a load being applied to the annular spring, not only the first elastic section and the second elastic section of the elastic section cancel off the load in each of the elastic sections, but also the elastic sections can cancel off the load with one another, and therefore, the allowable load is increased. Furthermore, when an even number of the elastic sections are provided, the number of the first elastic sections and the number of the second elastic sections become the same as the entire annular spring. Therefore, the tensile load and the compressive load which are applied to the elastic sections are well-balanced, and the deviation of the centers hardly occurs.

Further, in the annular spring of the present invention, a straight line that passes through a connection point of the first elastic section and the outer circumferential section, a connection point of the second elastic section and the outer circumferential section, and a connection point of the first elastic section, the second elastic section and the inner circumferential section preferably extends along a tangential line to the outer circumferential surface of the inner circumferential section in the connection point of the first elastic section and the inner circumferential section.

When the first elastic section and the second elastic section extend along the tangential line to the outer circumferential surface of the inner circumferential section, the elastic section easily absorbs an impact.

Further, in the annular spring of the present invention, the inner circumferential section is set as a first inner circumferential section, the elastic section that is disposed between the inner circumferential section and the outer circumferential section is set as an outer circumferential side elastic section, the first elastic section is set as an outer circumferential side first elastic section, and the second elastic section is set as an outer circumferential side second elastic section, the annular spring comprises an annular second inner circumferential section that is disposed on an inner circumferential side of the first inner circumferential section, and an inner circumferential side elastic section that is disposed between the first inner circumferential section and the second inner circumferential section, the inner circumferential side elastic section may be configured by an inner circumferential side first elastic section that has one end connected to an outer circumferential surface of the second inner circumferential section, and the other end connected to an inner circumferential surface of the first inner circumferential section, and an inner circumferential side second elastic section that has one end connected to the outer circumferential surface of the second inner circumferential section, and the other end connected to the inner circumferential surface of the first inner circumferential section, and is symmetrical to the inner circumferential side first elastic section about a line that passes through a center point of the second inner circumferential section and a connection point of the second inner circumferential section and the inner circumferential side first elastic section, and when either one of the first inner circumferential section or the second inner circumferential section rotates relatively to the other one, the inner circumferential side first elastic section and the inner circumferential side second elastic section may be elastically deformed in such a manner that either one of the inner circumferential side first elastic section and the inner circumferential side second elastic section is compressed, and the other one is stretched.

Further, in the annular spring of the present invention, in a case where a multistage structure comprising the first inner circumferential section and the second inner circumferential section is adopted, the first inner circumferential section may be a tubular member, and the outer circumferential section and the second inner circumferential section may be provided in positions that are shifted in an axial direction.

Further, in the annular spring of the present invention, the inner circumferential section may be a tubular member, and have a plurality of the outer circumferential sections that are disposed in positions shifted in an axial direction, on outer circumferential sides of the inner circumferential section, and the elastic sections may be provided between the inner circumferential section and the respective outer circumferential sections.

In order to achieve the above described object, a torque detecting device of the present invention comprises any one of the above described annular springs, and a sensor that is stuck on the outer circumferential section, the inner circumferential section, the elastic section, or the inner circumferential surface or the outer circumferential surface of the tubular inner circumferential section, and detects a strain amount.

The torque detecting device of the present invention which is configured as above is compacter and lighter in weight as compared with the torque detecting device using the conventional annular spring. Even though the annular spring is compact, in the above described positions, a space for disposing the sensor can be sufficiently ensured. Therefore, the space for disposing the sensor does not have to be separately provided, and the device does not increase in size. Further, the displacement amount of the annular spring in the above described position is an amount sufficient to detect the strain amount. Therefore, the strain amount can be detected with high precision, and torque can be calculated with high precision.

In order to achieve the above described object, a robot joint mechanism of the present invention comprises any one of the above described annular springs, a drive source, and a reduction mechanism that reduces a drive force from the drive source and transmits the drive force to the outer circumferential section or the inner circumferential section of the annular spring.

The robot joint mechanism of the present invention which is configured as above is compactor and lighter in weight, and absorbs an impact more easily, as compared with the robot joint mechanism using the conventional annular spring.

Further, as the robot joint mechanism of the present invention, the reduction mechanism may be a strain wave gearing that has a circular spline where a tooth section is formed on an inner circumferential surface, and a flex spline where a tooth section that is meshed with the tooth section of the circular spline is formed on an outer circumferential surface, and the tooth section of the circular spline may be provided at the inner circumferential section of the annular spring.

BRIEF DESCRIPTION OF THE DRAWINGS

FIG. 11 is a perspective view showing a configuration of a joint mechanism that is incorporated in an arm body of the robot in FIG. 10.

DETAILED DESCRIPTION OF THE PREFERRED EMBODIMENTS

First Embodiment

Figure 1:
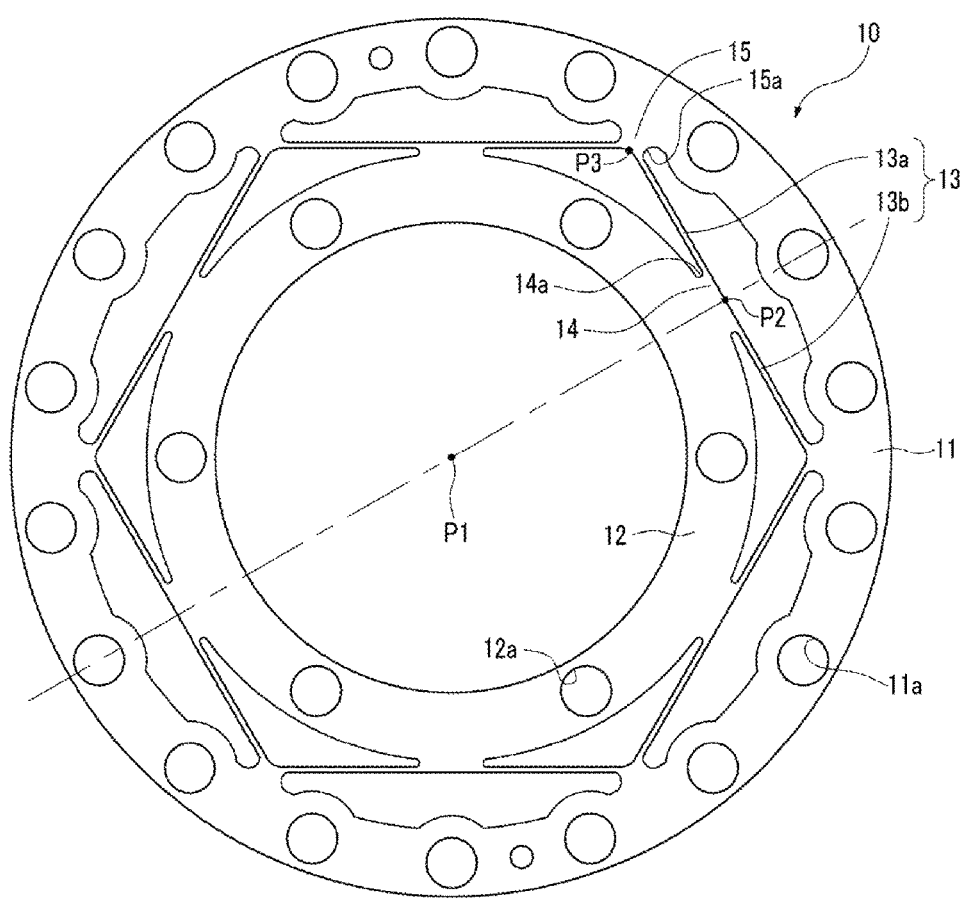
FIG. 1 is a plane view of an annular spring according to a first embodiment of the present invention.

As shown in FIG. 1, an annular spring 10 in a first embodiment comprises an annular outer circumferential section 11, an annular inner circumferential section 12 that is disposed on an inner circumferential side of the outer circumferential section 11, and an elastic section 13 that is disposed between the outer circumferential section 11 and the inner circumferential section 12. The annular spring 10 is formed from a metal material, and the respective sections are integrally configured.

The inner circumferential section 12 has an inner circumferential side connecting section 14 that extends outward in a radial direction, on an outer circumferential surface side, and is connected to the elastic section 13 at an end portion at the outer circumferential section 11 side, of the inner circumferential side connecting section 14. The outer circumferential section 11 has an outer circumferential side connecting section 15 that extends inward in the radial direction, at an inner circumferential surface side, and is connected to the elastic section 13 at an end portion at the inner circumferential section 12 side, of the outer circumferential side connecting section 15.

In the outer circumferential section 11 and the inner circumferential section 12, a plurality of holes 11a and 12a that penetrate in an axial direction are provided. The holes 11a and 12a can be also used when the outer circumferential section 11 or the inner circumferential section 12 of the annular spring 10 is fixed to a drive source or the like with bolts or the like. Further, the holes 11a and 12a also exhibit an effect of reduction in weight by lightening.

The elastic sections 13 comprise six sets of first elastic sections 13a and second elastic sections 13b corresponding to the first elastic sections 13a. Consequently, in the annular spring 10, at a time of a load being applied to the annular spring 10, not only the first elastic section 13a and the second elastic section 13b cancel off the load in each of the elastic sections 13, but also the elastic sections 13 can cancel off the load with one another. Further, since the number of first elastic sections 13a and the number of second elastic sections 13b are the same in the entire annular spring 10, a tensile load and a compressive load that are applied to the elastic section 13 are well-balanced, and a deviation of centers hardly occurs.

The first elastic section 13a of the elastic section 13 is plate-shaped, one end is connected to the inner circumferential side connecting section 14 at the outer circumferential surface of the inner circumferential section 12, and the other end is connected to the outer circumferential side connecting section 15 at the inner circumferential surface of the outer circumferential section 11. The first elastic section 13a and the outer circumferential section 11 are connected at a connection point P3 that is located at a position that is deviated from a line that passes through a center point P1 of the inner circumferential section 12 and a connection point P2 of the inner circumferential side connecting section 14 of the inner circumferential section 12 and the first elastic section 13a.

The second elastic section 13b of the elastic section 13 is plate-shaped, one end is connected to the inner circumferential side connecting section 14 at the outer circumferential surface of the inner circumferential section 12, and the other end is connected to the outer circumferential side connecting section 15 at the inner circumferential surface of the outer circumferential section 11. The second elastic section 13b is symmetrical to the first elastic section 13a about the line which passes through the center point P1 of the inner circumferential section 12 and the connection point P2 of the inner circumferential side connecting section 14 of the inner circumferential section 12 and the first elastic section 13a.

In the elastic section 13 which is configured as above, at a time of either one of the outer circumferential section 11 or the inner circumferential section 12 rotating relatively to the other one, the first elastic section 13a and the second elastic section 13b are elastically deformed in such a manner that one of the first elastic section 13a and the second elastic section 13b is compressed, and the other one is stretched.

Further, the first elastic section 13a and the second elastic section 13b are disposed to be symmetrical about the line. Consequently, when a load is applied, the tensile load and the compressive load which are applied to each of them are axially symmetrical about the center point P1 as the entire elastic section 13.

Further, a straight line that passes through the connection point P3 of the first elastic section 13a and the outer circumferential section 11, a connection point of the second elastic section 13b and the outer circumferential section 11 (that is, a connection point of the first elastic section 13a of the adjacent elastic section 13 and the outer circumferential section 11), and the connection point P2 of the first elastic section 13a, the second elastic section 13b and the inner circumferential section 12 extends along a tangential line to the outer circumferential surface of the inner circumferential section 12 in the connection point P2 of the first elastic section 13a and the inner circumferential section 12.

That is to say, the first elastic section 13a and the second elastic section 13b extend along the tangential line to the outer circumferential surface of the inner circumferential section 12. Consequently, the load which is applied to the elastic section 13 is efficiently cancelled off by the first elastic section 13a and the second elastic section 13b.

A side surface section 14a that is sandwiched by the inner circumferential section 12 and the elastic section 13 of the inner circumferential side connecting section 14 is in a shape recessed into an arc shape toward the connection point P2. A side surface section 15a that is sandwiched by the outer circumferential section 11 and the elastic section 13, of the outer circumferential side connecting section 15 is in a shape recessed into an arc shape toward the connection point P3.

In the inner circumferential side connecting section 14 and the outer circumferential side connecting section 15 which are configured as above, forces that are applied to the side surface sections 14a and 15a when a load is applied do not concentrate on one point, and therefore breakage hardly occurs in the sections.

Even though a displacement amount in the relative rotational direction of the outer circumferential section 11 and the inner circumferential section 12 is made large in the annular spring 10 of the present embodiment which is configured as described above, the length in the axial direction and the radius can be made smaller, and the weight can be also reduced, as compared with a case where an elastic section in which bending stress and torsional stress occur is used as the elastic section 13. Further, a deviation of the centers and hysteresis hardly occur, and therefore, when sensing is performed by using a strain sensor or the like, reliability thereof is high.

Second Embodiment

Figure 2:
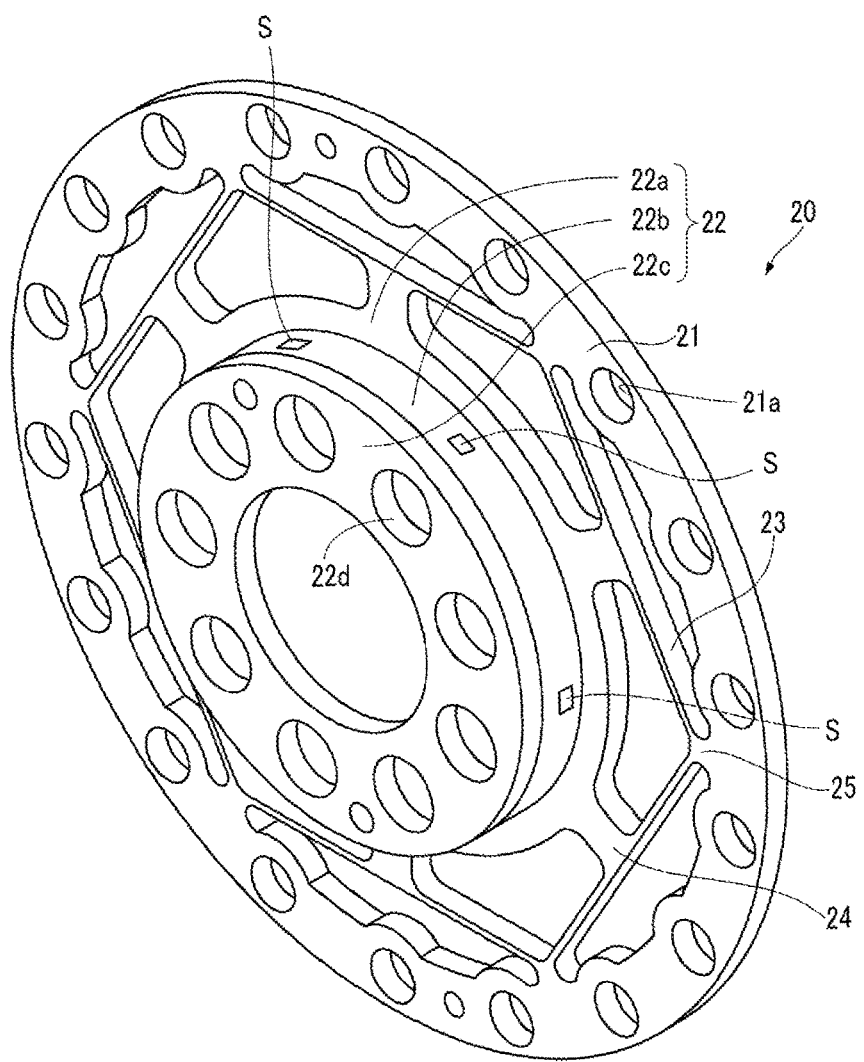
FIG. 2 is a perspective view of an annular spring according to a second embodiment of the present invention.

As shown in FIG. 2, an annular spring 20 in a second embodiment comprises an annular outer circumferential section 21, an inner circumferential section 22 that is disposed on an inner circumferential side of the outer circumferential section 21, and an elastic section 23 that is disposed between the outer circumferential section 21 and the inner circumferential section 22. The annular spring 20 is formed from a metal material, and the respective sections are integrally configured.

The inner circumferential section 22 has a first annular section 22a in a ring shape that is located on an inner side of the outer circumferential section 21, a tubular section 22b that has an end surface connected to the first annular section 22a, and a second annular section 22c that is connected to an end surface of the tubular section 22b, that is at an opposite side from the end surface to which the first annular section 22a is connected.

The inner circumferential section 22 has an inner circumferential side connecting section 24 that extends outward in a radial direction, on an outer circumferential surface side of the first annular section 22a, and is connected to the elastic section 23 at an end portion at the outer circumferential section 21 side, of the inner circumferential side connecting section 24. The outer circumferential section 21 has an outer circumferential side connecting section 25 that extends inward in the radial direction, at an inner circumferential surface side, and is connected to the elastic section 23 at an end portion at the inner circumferential section 22 side, of the outer circumferential side connecting section 25.

In the outer circumferential section 21 and the second annular section 22c of the inner circumferential section 22, a plurality of holes 21a and 22d that penetrate in an axial direction are provided. The holes 21a and 22d can be also used when the outer circumferential section 21 or the inner circumferential section 22 of the annular spring 20 are fixed to a drive source or the like with bolts or the like. Further, the holes 21a and 22d also exhibit an effect of reduction in weight by lightening.

Figure 3:
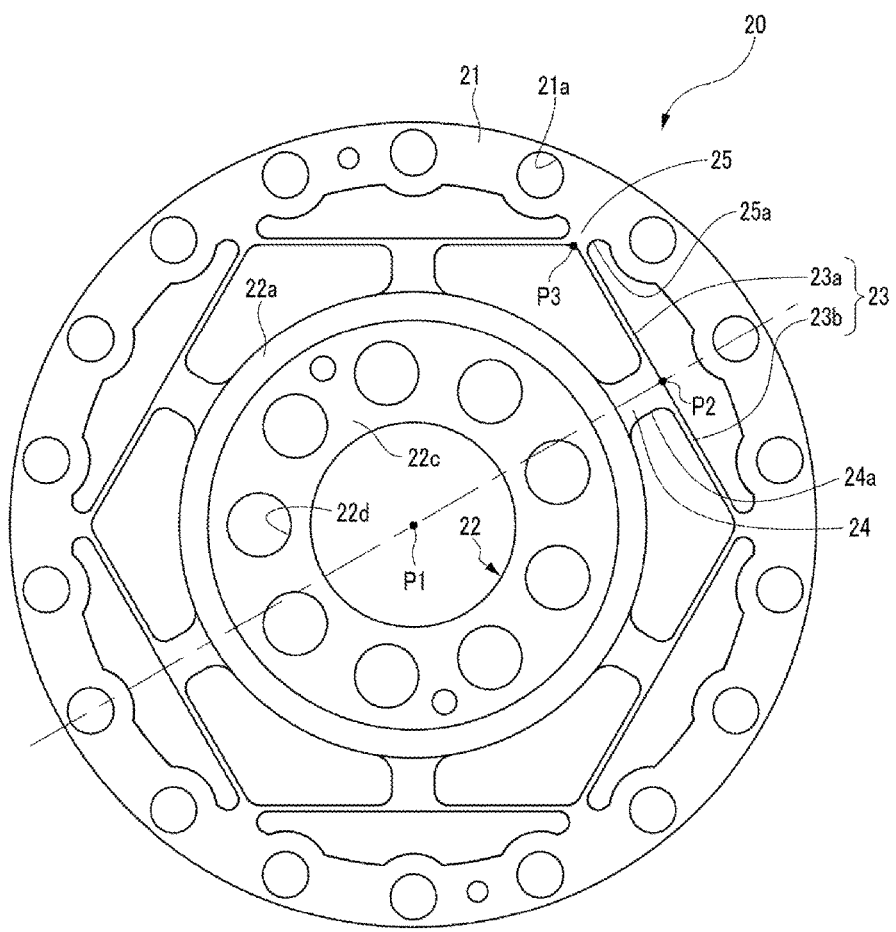
FIG. 3 is a plane view of the annular spring in FIG. 2.

As shown in FIG. 3, the elastic sections 23 comprise six sets of first elastic sections 23a and second elastic sections 23b corresponding to the first elastic sections 23a. Consequently, in the annular spring 20, at a time of a load being applied to the annular spring 20, not only the first elastic section 23a and the second elastic section 23b cancel off the load in each of the elastic sections 23, but also the elastic sections 23 can cancel off the load with one another. Further, since the number of the first elastic sections 23a and the number of the second elastic sections 23b are the same in the entire annular spring 20, a tensile load and a compressive load that are applied to the elastic section 23 are well-balanced, and a deviation of centers hardly occurs.

The first elastic section 23a of the elastic section 23 is plate-shaped, one end is connected to the inner circumferential side connecting section 24 at the outer circumferential surface of the first annular section 22a of the inner circumferential section 22, and the other end is connected to the outer circumferential side connecting section 25 at the inner circumferential surface of the outer circumferential section 21. The first elastic section 23a and the outer circumferential section 21 are connected at the connection point P3 which is located at a position that is deviated from a line that passes through the center point P1 of the inner circumferential section 22 and the connection point P2 of the inner circumferential side connecting section 24 of the first annular section 22a of the inner circumferential section 22 and the first elastic section 23a.

The second elastic section 23b of the elastic section 23 is plate-shaped, one end is connected to the inner circumferential side connecting section 24 at the outer circumferential surface of the first annular section 22a of the inner circumferential section 22, and the other end is connected to the outer circumferential side connecting section 25 at the inner circumferential surface of the outer circumferential section 21. The second elastic section 23b is symmetrical to the first elastic section 23a about the line which passes through the center point P1 of the inner circumferential section 22 and the connection point P2 of the inner circumferential side connecting section 24 of the first annular section 22a of the inner circumferential section 22 and the first elastic section 23a.

In the elastic section 23 which is configured as above, at a time of either one of the outer circumferential section 21 or the first annular section 22a of the inner circumferential section 22 rotating relatively to the other one, the first elastic section 23a and the second elastic section 23b are elastically deformed in such a manner that one of the first elastic section 23a and the second elastic section 23b is compressed and the other one is stretched.

Further, the first elastic section 23a and the second elastic section 23b are disposed to be symmetrical about the line. Consequently, when a load is applied, the tensile load and the compressive load applied to each of them are axially symmetrical about the center point P1 as the entire elastic section 23.

Further, a straight line that passes through the connection point P3 of the first elastic section 23a and the outer circumferential section 21, a connection point of the second elastic section 23b and the outer circumferential section 21 (that is, a connection point of the first elastic section 23a of the adjacent elastic section 23 and the outer circumferential section 21), and the connection point P2 of the first elastic section 23a, the second elastic section 23b and the inner circumferential section 22 extends along a tangential line to the outer circumferential surface of the inner circumferential section 22 in the connection point P2 of the first elastic section 23a and the inner circumferential section 22.

That is to say, the first elastic section 23a and the second elastic section 23b extend along the tangential line to the outer circumferential surface of the inner circumferential section 22. Consequently, the load which is applied to the elastic section 23 is efficiently cancelled off by the first elastic section 23a and the second elastic section 23b.

A side surface section 24a of the inner circumferential side connecting section 24, which is sandwiched by the first annular section 22a of the inner circumferential section 22 and the elastic section 23, is in a shape that is recessed into an arc shape toward the connection point P2. A side surface section 25a of the outer circumferential side connecting section 25, which is sandwiched by the outer circumferential section 21 and the elastic section 23 is in a shape that is recessed into an arc shape toward the connection point P3.

In the inner circumferential side connecting section 24 and the outer circumferential side connecting section 25 which are configured as above, forces that are applied to the side surface sections 24a and 25a when a load is applied do not concentrate on one point, and therefore breakage hardly occurs in that sections.

In the annular spring 20 of the present embodiment which is configured as described above, the length in the axial direction and the radius can be made smaller, and the weight can be also reduced similarly to the annular spring 10 in the first embodiment, as compared with a case where an elastic section in which bending stress and torsional stress occur is used as the elastic section. Further, a deviation of the centers and hysteresis hardly occur, and therefore, when sensing is performed by using a strain sensor or the like, reliability thereof is high.

Further, in the annular spring 20 of the present embodiment, the tubular section 22b of the inner circumferential section 22 can be configured as a torsion bar. Further, in the tubular section 22b, an elastic section and a connection section for connecting to the elastic section are not provided on the circumferential surface portion, and therefore, a strain sensor or the like can be easily stuck thereon.

Figure 4:
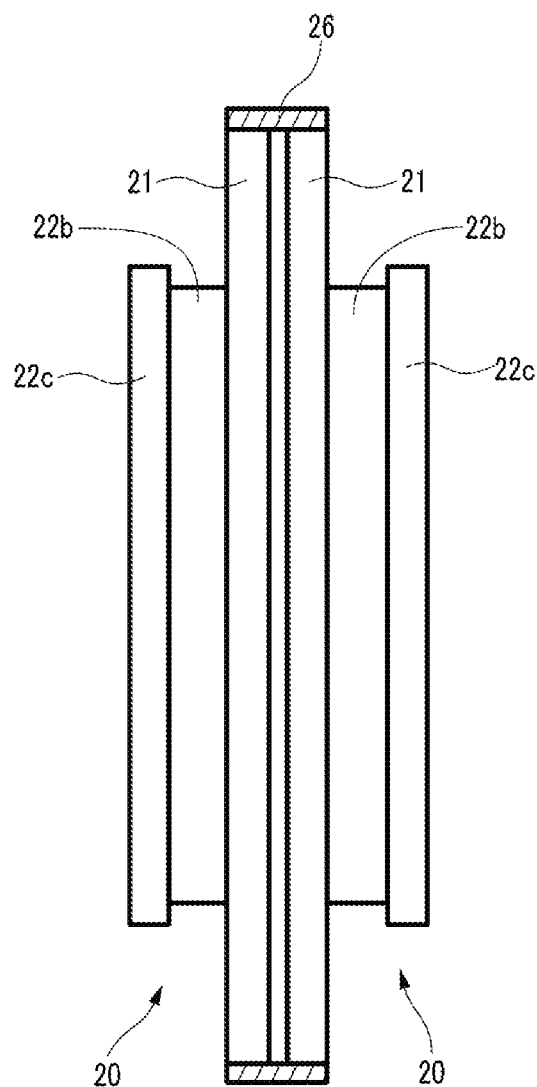
FIG. 4 is a side view showing a case where two of the annular springs in FIG. 2 are connected by being laid on each other in an axial direction.

Further, when a plurality of annular springs 20 are connected, as shown in FIG. 4, the annular springs 20 are preferably connected in such a manner that the outer circumferential sections 21 are disposed to oppose each other, and an annular connection member 26 is fitted onto outer circumferential surfaces of the outer circumferential sections 21. FIG. 4 shows only a section of the connection member 26. By connecting the annular springs 20 like this, a displacement amount can be made larger than in a case where the annular spring 20 is used singly.

When a sensor S for detecting a strain amount is stuck onto the annular spring 20, a plurality of sensors are preferably stuck to be equidistant in a circumferential direction, in substantially midpoint positions between the first annular section 22a and the second annular section 22c, on an outer circumferential surface of the tubular section 22b of the inner circumferential section 22. Further, the positions are preferably at substantially midpoint positions between the adjacent inner circumferential side connecting sections 24. This is because the positions are locations that easily bend to a large degree when a load is applied to the annular spring 20, and therefore, the strain amount can be detected with high precision.

Third Embodiment

Figure 5:
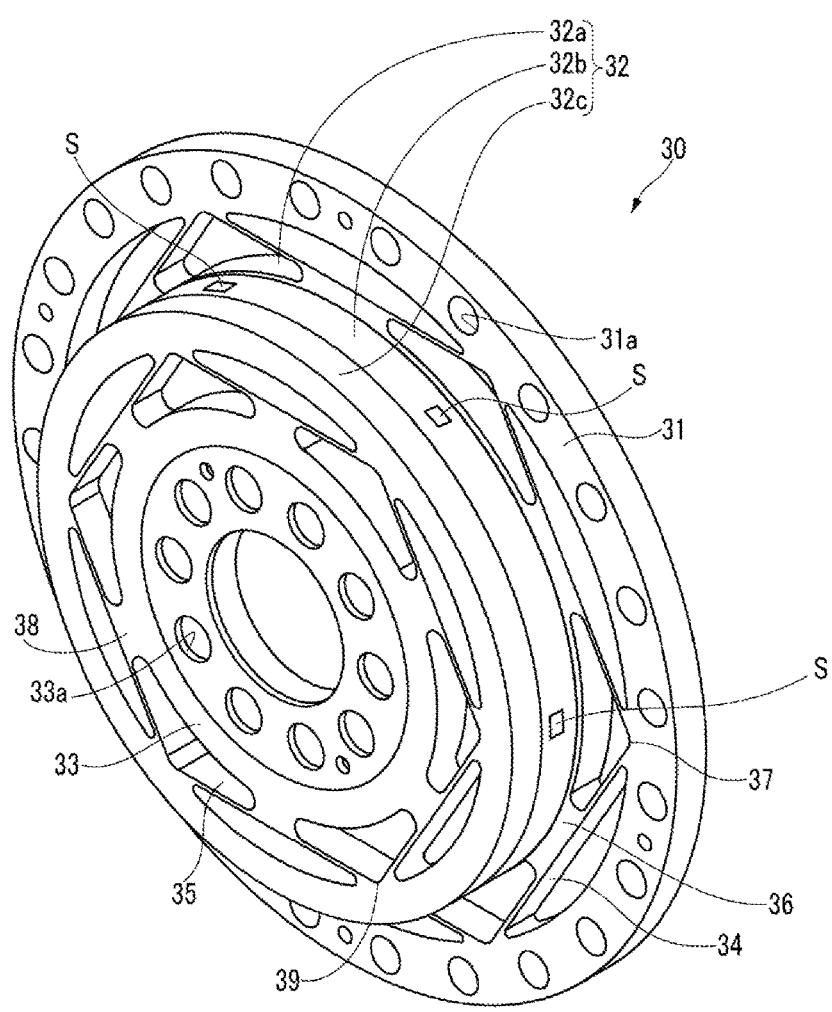
FIG. 5 is a perspective view of an annular spring according to a third embodiment of the present invention.

As shown in FIG. 5, an annular spring 30 in a third embodiment comprises an annular outer circumferential section 31, a first inner circumferential section 32 that is disposed on an inner circumferential side of the outer circumferential section 31, an annular second inner circumferential section 33 that is disposed on an inner circumferential side of the first inner circumferential section 32, an outer circumferential side elastic section 34 that is disposed between the outer circumferential section 31 and the first inner circumferential section 32, and an inner circumferential side elastic section 35 that is disposed between the first inner circumferential section 32 and the second inner circumferential section 33. The annular spring 30 is formed from a metal material, and the respective sections are integrally configured.

The first inner circumferential section 32 has a first annular section 32a in a ring shape that is located on an inner side of the outer circumferential section 31, a tubular section 32b that has an end surface connected to the first annular section 32a, and a second annular section 32c that is connected to an end surface of the tubular section 32b, that is at an opposite side from the end surface to which the first annular section 32a is connected.

The first inner circumferential section 32 has a first inner circumferential side connecting section 36 that extends outward in a radial direction, on an outer circumferential surface side of the first annular section 32a, and is connected to the outer circumferential side elastic section 34 at an end portion at the outer circumferential section 31 side, of the first inner circumferential side connecting section 36. The outer circumferential section 31 has a first outer circumferential side connecting section 37 that extends inward in the radial direction, at an inner circumferential surface side, and is connected to the outer circumferential side elastic section 34 at an end portion at the first inner circumferential section 32 side, of the first outer circumferential side connecting section 37.

Further, the second inner circumferential section 33 has a second inner circumferential side connecting section 38 that extends outward in a radial direction, on an outer circumferential surface side, and is connected to the inner circumferential side elastic section 35 at an end portion at the first inner circumferential section 32 side, of the second inner circumferential side connecting section 38. The first inner circumferential section 32 has a second outer circumferential side connecting section 39 that extends inward in the radial direction, at an inner circumferential surface side of the second annular section 32c, and is connected to the inner circumferential side elastic section 35 at an end portion at the second inner circumferential section 33 side, of the second outer circumferential side connecting section 39.

In the outer circumferential section 31 and the second inner circumferential section 33, a plurality of holes 31a and 33a that penetrate in an axial direction are provided. The holes 31a and 33a can be also used when the outer circumferential section 31 or the second inner circumferential section 33 of the annular spring 30 are fixed to a drive source or the like with bolts or the like. Further, the holes 31a and 33a also exhibit an effect of reduction in weight by lightening.

Figure 6:
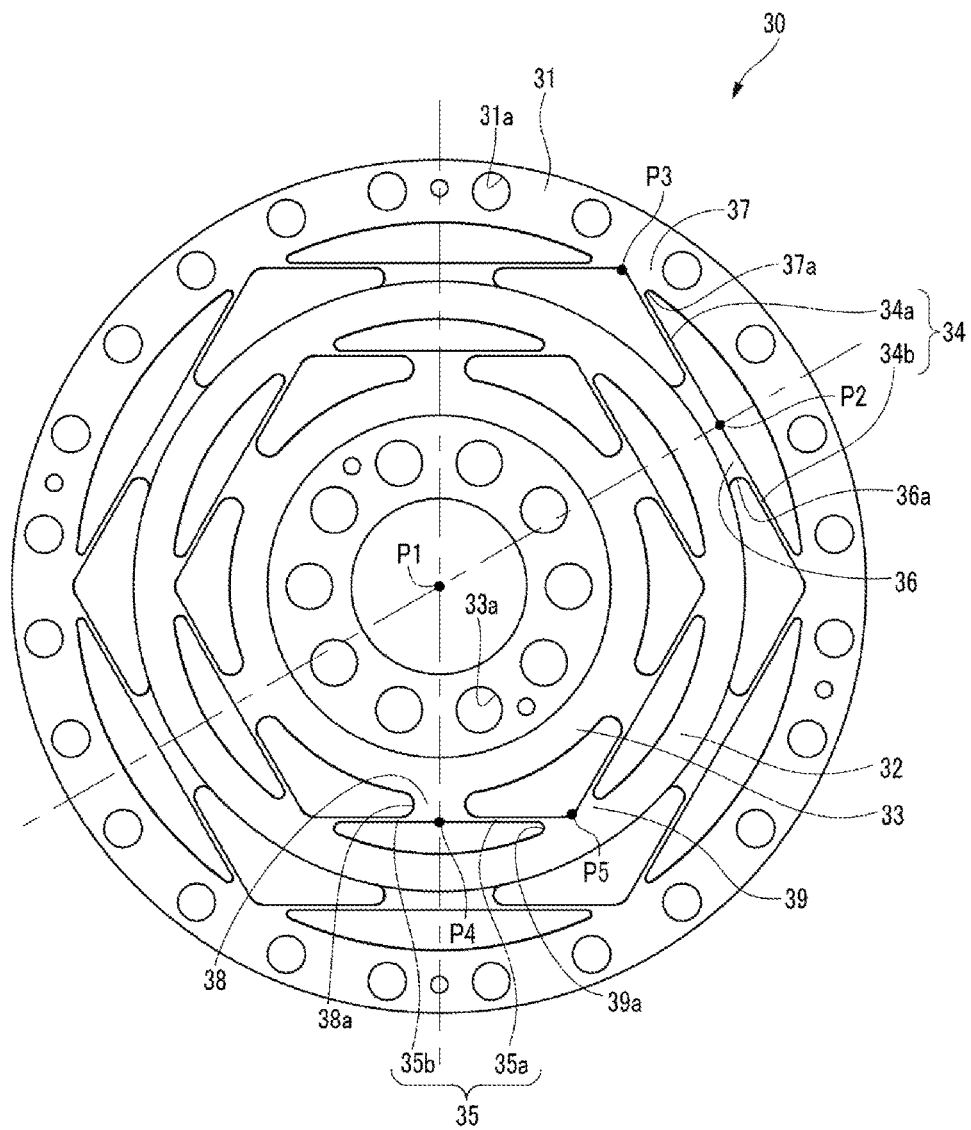
FIG. 6 is a plane view of the annular spring in FIG. 5.

As shown in FIG. 6, the outer circumferential side elastic sections 34 comprise six sets of first elastic sections 34a and second elastic sections 34b corresponding to the first elastic sections 34a. Consequently, between the outer circumferential section 31 and the first inner circumferential section 32, at a time of a load being applied to either one of the outer circumferential section 31 or the first inner circumferential section 32, not only the first elastic section 34a and the second elastic section 34b cancel off the load in each of the outer circumferential side elastic sections 34, but also the outer circumferential side elastic sections 34 can cancel off the load with one another. Further, since the number of the first elastic sections 34a and the number of the second elastic sections 34b are the same between the outer circumferential section 31 and the first inner circumferential section 32, a tensile load and a compressive load that are applied to the outer circumferential side elastic section 34 are well-balanced, and a deviation of centers hardly occurs.

The first elastic section 34a of the outer circumferential side elastic section 34 is plate-shaped, one end is connected to the first inner circumferential side connecting section 36 at the outer circumferential surface of the first annular section 32a of the first inner circumferential section 32, and the other end is connected to the first outer circumferential side connecting section 37 at the inner circumferential surface of the outer circumferential section 31. The first elastic section 34a and the outer circumferential section 31 are connected at the connection point P3 which is located at a position that is shifted from a line that passes through the center point P1 of the first inner circumferential section 32 and the connection point P2 of the first inner circumferential side connecting section 36 of the first annular section 32a of the first inner circumferential section 32 and the first elastic section 34a.

The second elastic section 34b of the outer circumferential side elastic section 34 is plate-shaped, one end is connected to the first inner circumferential side connecting section 36 at the outer circumferential surface of the first annular section 32a of the first inner circumferential section 32, and the other end is connected to the first outer circumferential side connecting section 37 at the inner circumferential surface of the outer circumferential section 31. The second elastic section 34b is symmetrical to the first elastic section 34a about the line which passes through the center point P1 of the first inner circumferential section 32 and the connection point P2 of the first inner circumferential side connecting section 36 of the first annular section 32a of the first inner circumferential section 32 and the first elastic section 34a.

In the outer circumferential side elastic section 34 which is configured as above, at a time of either one of the outer circumferential section 31 or the first annular section 32a of the first inner circumferential section 32 rotating relatively to the other one, the first elastic section 34a and the second elastic section 34b are elastically deformed in such a manner that one of the first elastic section 34a and the second elastic section 34b is compressed and the other one is stretched.

Further, the first elastic section 34a and the second elastic section 34b are disposed to be symmetrical about the line. Consequently, when a load is applied, the tensile load and the compressive load which are applied to each of them are axially symmetrical about the center point P1 as the entire outer circumferential side elastic section 34.

Further, a straight line that passes through the connection point P3 of the first elastic section 34a and the outer circumferential section 31, a connection point of the second elastic section 34b and the outer circumferential section 31 (that is, a connection point of the first elastic section 34a of the adjacent outer circumferential side elastic section 34 and the outer circumferential section 31), and the connection point P2 of the first elastic section 34a, the second elastic section 34b and the first inner circumferential section 32 extends along a tangential line to the outer circumferential surface of the first inner circumferential section 32 in the connection point P2 of the first elastic section 34a and the first inner circumferential section 32.

That is to say, the first elastic section 34a and the second elastic section 34b extend along the tangential line to the outer circumferential surface of the first inner circumferential section 32. Consequently, the load which is applied to the outer circumferential side elastic section 34 is efficiently cancelled off by the first elastic section 34a and the second elastic section 34b.

The inner circumferential side elastic sections 35 comprise six sets of first elastic sections 35a and second elastic sections 35b corresponding to the first elastic sections 35a. Consequently, between the first inner circumferential section 32 and the second inner circumferential section 33, at a time of a load being applied to either one of the first inner circumferential section 32 or the second inner circumferential section 33, not only the first elastic section 35a and the second elastic section 35b cancel off the load in each of the inner circumferential side elastic sections 35, but also the inner circumferential side elastic sections 35 can cancel off the load with one another. Further, since the number of the first elastic sections 35a and the number of the second elastic sections 35b are the same between the first inner circumferential section 32 and the second inner circumferential section 33, a tensile load and a compressive load that are applied to the inner circumferential side elastic section 35 are well-balanced, and a deviation of centers hardly occurs.

The first elastic section 35a of the inner circumferential side elastic section 35 is plate-shaped, one end is connected to the second inner circumferential side connecting section 38 at the outer circumferential surface of the second inner circumferential section 33, and the other end is connected to the second outer circumferential side connecting section 39 at the inner circumferential surface of the second annular section 32c of the first inner circumferential section 32. The first elastic section 35a and the first inner circumferential section 32 are connected at a connection point P5 which is located at a position that is shifted from a line that passes through the center point P1 of the second inner circumferential section 33 and a connection point P4 of the second inner circumferential side connecting section 38 of the second inner circumferential section 33 and the first elastic section 35a.

The second elastic section 35b of the inner circumferential side elastic section 35 is plate-shaped, one end is connected to the second inner circumferential side connecting section 38 at the outer circumferential surface of the second inner circumferential section 33, and the other end is connected to the second outer circumferential side connecting section 39 at the inner circumferential surface of the second annular section 32c of the first inner circumferential section 32. The second elastic section 35b is symmetrical to the first elastic section 35a about the line which passes through the center point P1 of the second inner circumferential section 33 and the connection point P4 of the second inner circumferential side connecting section 38 of the second inner circumferential section 33 and the first elastic section 35a.

In the inner circumferential side elastic section 35 which is configured as above, at a time of either one of the second annular section 32c of the first inner circumferential section 32 or the second inner circumferential section 33 rotating relatively to the other one, the first elastic section 35a and the second elastic section 35b are elastically deformed in such a manner that one of the first elastic section 35a and the second elastic section 35b is compressed, and the other one is stretched.

Further, the first elastic section 35a and the second elastic section 35b are disposed to be symmetrical about the line. Consequently, when a load is applied, the tensile load and the compressive load which are applied to the respective elastic sections are axially symmetrical about the center point P1 as the entire inner circumferential side elastic section 35.

That is to say, the annular spring 30 has a multistage structure that is configured by disposing an annular spring that is configured by the outer circumferential section 31, the first annular section 32a of the first inner circumferential section 32, and the outer circumferential side elastic section 34 on an outer circumferential side of an annular spring that is configured by the second annular section 32c of the first inner circumferential section 32, the second inner circumferential section 33, and the inner circumferential side elastic section 35.

Further, a straight line that passes through the connection point P5 of the first elastic section 35a and the first inner circumferential section 32, a connection point of the second elastic section 35b and the first inner circumferential section 32 (that is, a connection point of the first elastic section 35a of the adjacent inner circumferential side elastic section 35 and the first inner circumferential section 32), and the connection point P4 of the first elastic section 35a, the second elastic section 35b and the second inner circumferential section 33 extends along a tangential line to the outer circumferential surface of the second inner circumferential section 33 in the connection point P4 of the first elastic section 35a and the second inner circumferential section 33.

That is to say, the first elastic section 35a and the second elastic section 35b extend along the tangential line to the outer circumferential surface of the second inner circumferential section 33. Consequently, the load which is applied to the inner circumferential side elastic section 35 is efficiently cancelled off by the first elastic section 35a and the second elastic section 35b.

A side surface section 36a of the first inner circumferential side connecting section 36, which is sandwiched by the first annular section 32a of the first inner circumferential section 32 and the outer circumferential side elastic section 34, is in a shape that is recessed into an arc shape toward the connection point P2. A side surface section 37a of the first outer circumferential side connecting section 37, which is sandwiched by the outer circumferential section 31 and the outer circumferential side elastic section 34 is in a shape that is recessed into an arc shape toward the connection point P3.

A side surface section 38a of the second inner circumferential side connecting section 38, which is sandwiched by the second inner circumferential section 33 and the inner circumferential side elastic section 35, is in a shape that is recessed into an arc shape toward the connection point P4. A side surface section 39a of the second outer circumferential side connecting section 39, which is sandwiched by the second annular section 32c of the first inner circumferential section 32 and the inner circumferential side elastic section 35 is in a shape that is recessed into an arc shape toward the connection point P5.

In the first inner circumferential side connecting section 36, the first outer circumferential side connecting section 37, the second inner circumferential side connecting section 38 and the second outer circumferential side connecting section 39 which are configured as above, forces which are applied to the side surface sections 36a, 37a, 38a and 39a when a load is applied do not concentrate on one point, and therefore breakage hardly occurs in the sections.

In the annular spring 30 of the present embodiment which is configured as described above, the length in the axial direction and the radius can be made smaller, and the weight can be also reduced, similarly to the annular spring 10 in the first embodiment and the annular spring 20 in the second embodiment, as compared with a case where an elastic section in which bending stress and torsional stress occur is used as the elastic section. Further, a deviation of the centers and hysteresis hardly occur, and therefore, when sensing is performed by using a strain sensor or the like, reliability thereof is high.

Further, in the annular spring 30 of the present embodiment, the tubular section 32b of the first inner circumferential section 32 can be configured as a torsion bar, similarly to the annular spring 20 in the second embodiment. Further, in the tubular section 32b, an elastic section and a connection section for connecting to the elastic section are not provided on the circumferential surface portion, and therefore, a strain sensor or the like can be easily stuck thereon.

Furthermore, since the annular spring 30 in the present embodiment has a multistage structure formed of the two annular springs, the annular spring 30 can be displaced to a larger degree than the annular spring 10 in the first embodiment and the annular spring 20 in the second embodiment, and therefore easily absorbs an impact.

In the present embodiment, the two annular springs are formed in the positions which are shifted in the axial direction via the tubular section 32b of the first inner circumferential section 32. However, the two annular springs may be formed on the same plane by adopting a single annular member as the first inner circumferential section and the first inner circumferential section is located on the inner side of the outer circumferential section.

Further, when the sensor S for detecting a strain amount is stuck onto the annular spring 30, a plurality of sensors are preferably stuck to be equidistant in a circumferential direction, at substantially midpoint positions between the first annular section 32a and the second annular section 32c, on an outer circumferential surface of the tubular section 32b of the first inner circumferential section 32. Further, the positions are preferably at substantially midpoint positions between the adjacent first inner circumferential side connecting sections 36. This is because the positions are such locations that easily bend to a large degree when a load is applied to the annular spring 30, and therefore, the strain amount can be detected with high precision.

Fourth Embodiment

Figure 7:
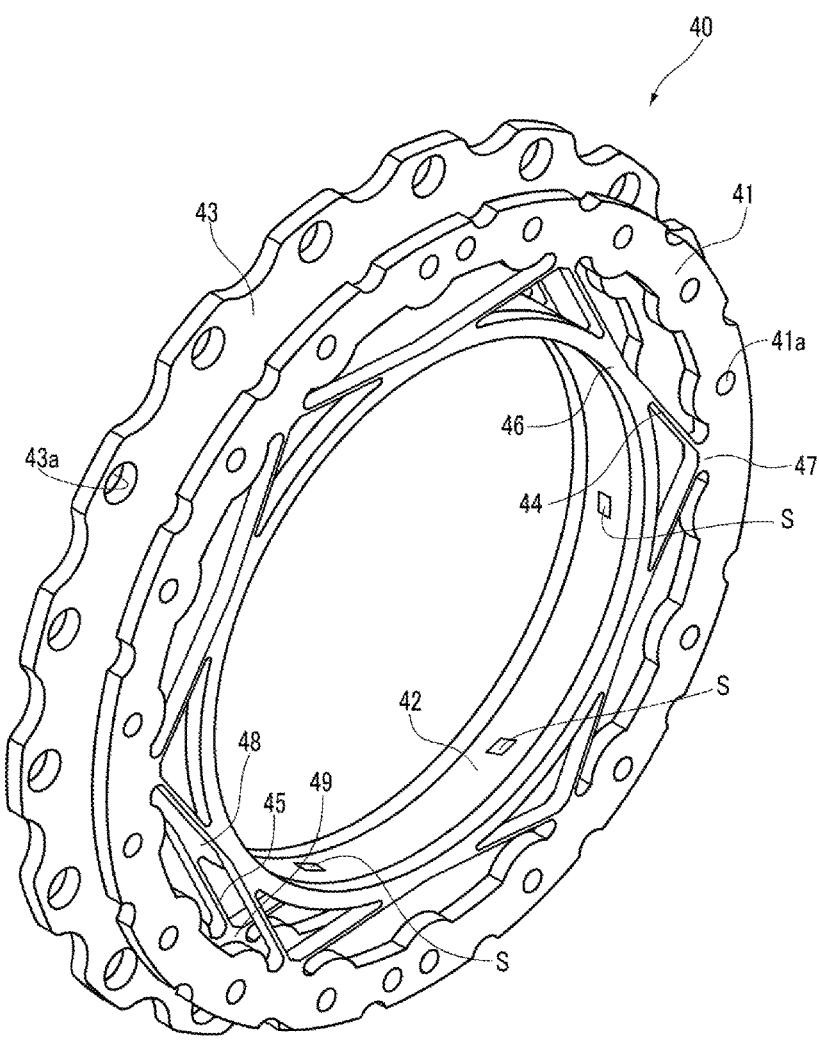
FIG. 7 is a perspective view of an annular spring according to a fourth embodiment of the present invention.

As shown in FIG. 7, an annular spring 40 in a fourth embodiment comprises an annular one end side outer circumferential section 41, a tubular inner circumferential section 42 that has one end portion disposed on an inner circumferential side of the one end side outer circumferential section 41, an annular other end side outer circumferential section 43 where the other end portion of the inner circumferential section 42 is disposed on an inner circumferential side, a one end side elastic section 44 that is disposed between the one end side outer circumferential section 41 and the inner circumferential section 42, and the other end side elastic section 45 that is disposed between the other end side outer circumferential section 43 and the inner circumferential section 42. The annular spring 40 is formed from a metal material, and the respective sections are integrally configured.

The inner circumferential section 42 has a first inner circumferential side connecting section 46 that extends outward in the radial direction, on an outer circumferential surface side of one end portion, and connects to the one end side elastic section 44 at an end portion at the one end side outer circumferential section 41 side, of the first inner circumferential side connecting section 46. The one end side outer circumferential section 41 has a first outer circumferential side connecting section 47 that extends inward in the radial direction, on an inner circumferential surface side, and connects to the one end side elastic section 44 at an end portion at the inner circumferential section 42 side, of the first outer circumferential side connecting section 47.

Further, the inner circumferential section 42 has a second inner circumferential side connecting section 48 that extends outward in the radial direction, on an outer circumferential surface side of the other end portion, and connects to the other end side elastic section 45 at an end portion at the other end side outer circumferential section 43 side, of the second inner circumferential side connecting section 48. The other end side outer circumferential section 43 has a second outer circumferential side connecting section 49 that extends inward in the radial direction, on an inner circumferential surface side, and connects to the other end side elastic section 45 at an end portion at the inner circumferential section 42 side, of the second outer circumferential side connecting section 49.

In the one end side outer circumferential section 41 and the other end side outer circumferential section 43, a plurality of holes 41a and 43a that penetrate in an axial direction are provided. The holes 41a and 43a can be also used when the one end side outer circumferential section 41 or the other end side outer circumferential section 43 of the annular spring 40 are fixed to a drive source or the like with bolts or the like. Further, the holes 41a and 43a also exhibit an effect of reduction in weight by lightening.

Figure 8:
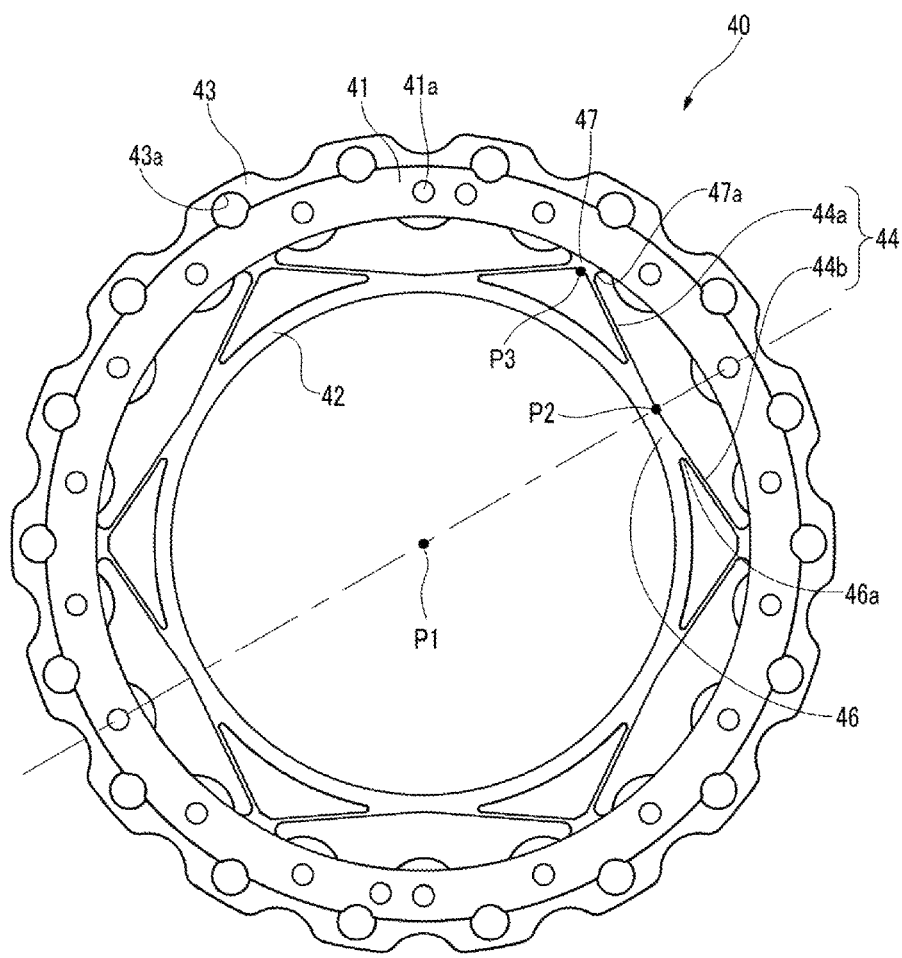
FIG. 8 is a front view of the annular spring in FIG. 7.

As shown in FIG. 8, the one end side elastic sections 44 comprise six sets of first elastic sections 44a and second elastic sections 44b corresponding to the first elastic sections 44a. Consequently, between the one end side outer circumferential section 41 and the inner circumferential section 42, at a time of a load being applied to either one of them, not only the first elastic section 44a and the second elastic section 44b cancel off the load in each of the one end side elastic sections 44, but also the one end side elastic sections 44 can cancel off the load with one another. Further, since the number of the first elastic sections 44a and the number of the second elastic sections 44b are the same between the one end side outer circumferential section 41 and the inner circumferential section 42, a tensile load and a compressive load that are applied to the one end side elastic section 44 are well-balanced, and a deviation of centers hardly occurs.

The first elastic section 44a of the one end side elastic section 44 is plate-shaped, one end is connected to the first inner circumferential side connecting section 46 at the outer circumferential surface of the one end portion of the inner circumferential section 42, and the other end is connected to the first outer circumferential side connecting section 47 at the inner circumferential surface of the one end side outer circumferential section 41. The first elastic section 44a and the one end side outer circumferential section 41 are connected at the connection point P3 which is located at a position that is shifted from a line that passes through the center point P1 of the inner circumferential section 42 and the connection point P2 of the first inner circumferential side connecting section 46 of the one end portion of the inner circumferential section 42 and the first elastic section 44a.

The second elastic section 44b of the one end side elastic section 44 is plate-shaped, one end is connected to the first inner circumferential side connecting section 46 at the outer circumferential surface of the one end portion of the inner circumferential section 42, and the other end is connected to the first outer circumferential side connecting section 47 at the inner circumferential surface of the one end side outer circumferential section 41. The second elastic section 44b is symmetrical to the first elastic section 44a about the line which passes through the center point P1 of the inner circumferential section 42 and the connection point P2 of the first inner circumferential side connecting section 46 of the one end portion of the inner circumferential section 42 and the first elastic section 44a.

In the one end side elastic section 44 which is configured as above, at a time of either one of the one end side outer circumferential section 41 or the one end portion of the inner circumferential section 42 rotating relatively to the other one, the first elastic section 44a and the second elastic section 44b are elastically deformed in such a manner that either one of the first elastic section 44a or the second elastic section 44b is compressed, and the other one is stretched.

Further, the first elastic section 44a and the second elastic section 44b are disposed to be symmetrical about the line. Consequently, when a load is applied, the tensile load and the compressive load which are applied to the respective elastic sections are axially symmetrical about the center point P1 as the entire one end side elastic section 44.

Figure 9:
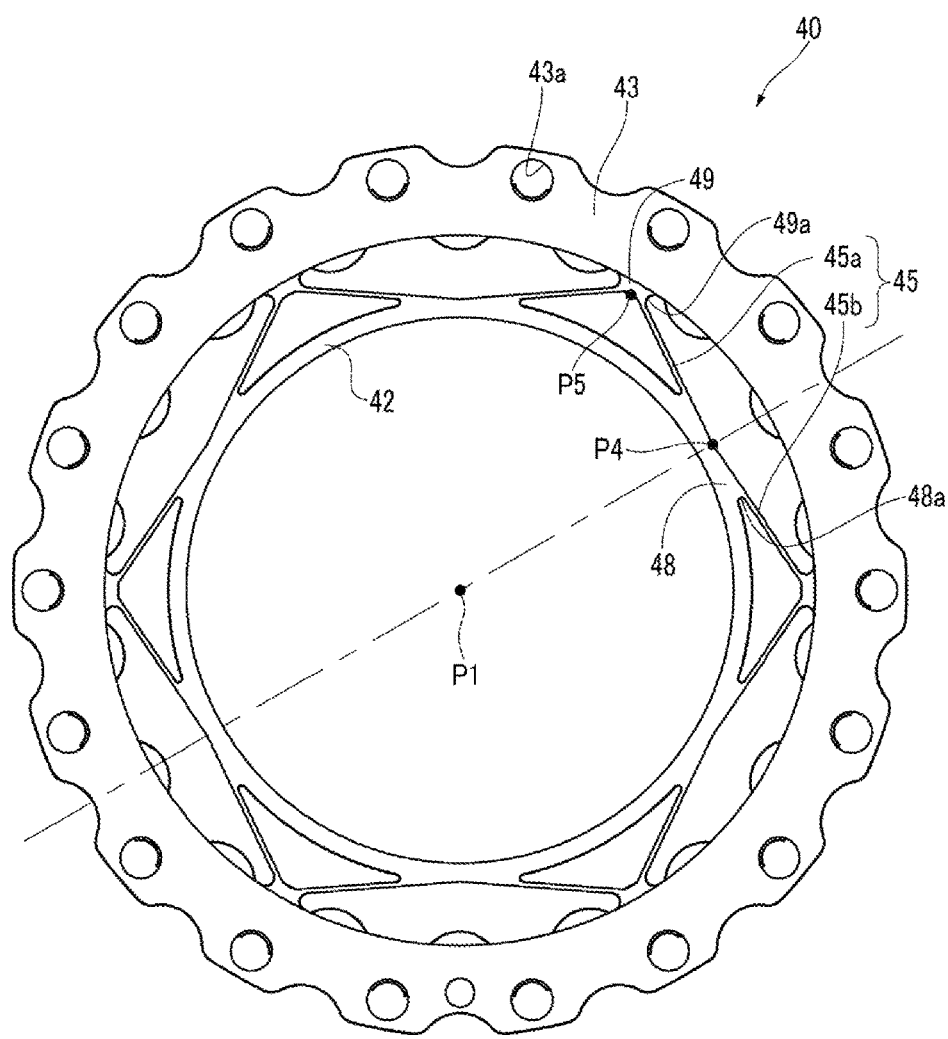
FIG. 9 is a rear view of the annular spring in FIG. 7.

As shown in FIG. 9, the other end side elastic sections 45 comprise six sets of first elastic sections 45a and second elastic sections 45b corresponding to the first elastic sections 45a. Consequently, between the other end side outer circumferential section 43 and the inner circumferential section 42, at a time of a load being applied to either one of the other end side outer circumferential section 43 or the inner circumferential section 42, not only the first elastic section 45a and the second elastic section 45b cancel off the load in each of the other end side elastic sections 45, but also the other end side elastic sections 45 can cancel off the load with one another. Further, since the number of the first elastic sections 45a and the number of the second elastic sections 45b are the same between the other end side outer circumferential section 43 and the inner circumferential section 42, a tensile load and a compressive load that are applied to the other end side elastic section 45 are well-balanced, and a deviation of centers hardly occurs.

The first elastic section 45a of the other end side elastic section 45 is plate-shaped, one end is connected to the second inner circumferential side connecting section 48 at the outer circumferential surface of the other end portion of the inner circumferential section 42, and the other end is connected to the second outer circumferential side connecting section 49 at the inner circumferential surface of the other end side outer circumferential section 43. The first elastic section 45a and the inner circumferential section 42 are connected at the connection point P5 which is located at a position that is shifted from a line that passes through the center point P1 of the inner circumferential section 42 and the connection point P4 of the second inner circumferential side connecting section 48 at the other end portion of the inner circumferential section 42 and the first elastic section 45a.

The second elastic section 45b of the other end side elastic section 45 is plate-shaped, one end is connected to the second inner circumferential side connecting section 48 at the outer circumferential surface of the other end portion of the inner circumferential section 42, and the other end is connected to the second outer circumferential side connecting section 49 at the inner circumferential surface of the other end side outer circumferential section 43. The second elastic section 45b is symmetrical to the first elastic section 45a about the line which passes through the center point P1 of the inner circumferential section 42 and the connection point P4 of the second inner circumferential side connecting section 48 at the other end side of the inner circumferential section 42 and the first elastic section 45a.

In the other end side elastic section 45 which is configured as above, at a time of either one of the other end side outer circumferential section 43 or the other end portion of the inner circumferential section 42 rotating relatively to the other one, the first elastic section 45a and the second elastic section 45b are elastically deformed in such a manner that one of them is compressed, and the other one is stretched.

Further, the first elastic section 45a and the second elastic section 45b are disposed to be symmetrical about the line. Consequently, when a load is applied, the tensile load and the compressive load which are applied to the respective elastic sections are axially symmetrical about the center point P1 as the entire other end side elastic section 45.

That is to say, the annular spring 40 has a multilayer structure that is configured by arranging an annular spring that is configured by the one end side outer circumferential section 41, the one end portion of the inner circumferential section 42 and the one end side elastic section 44, and an annular spring that is configured by the other end side outer circumferential section 43, the other end portion of the inner circumferential section 42 and the other end side elastic section 45 in the axial direction.

A side surface section 46a of the first inner circumferential side connecting section 46, which is sandwiched by the one end side of the inner circumferential section 42 and the one end side elastic section 44, is in a shape that is recessed into an arc shape toward the connection point P2. A side surface section 47a of the first outer circumferential side connecting section 47, which is sandwiched by the one end side outer circumferential section 41 and the one end side elastic section 44 is in a shape that is recessed into an arc shape toward the connection point P3.

A side surface section 48a of the second inner circumferential side connecting section 48, which is sandwiched by the other end side of the inner circumferential section 42 and the other end side elastic section 45, is in a shape that is recessed into an arc shape toward the connection point P4. A side surface section 49a of the second outer circumferential side connecting section 49, which is sandwiched by the other end side outer circumferential section 43 and the other end side elastic section 45 is in a shape that is recessed into an arc shape toward the connection point P5.

In the first inner circumferential side connecting section 46, the first outer circumferential side connecting section 47, the second inner circumferential side connecting section 48 and the second outer circumferential side connecting section 49 which are configured as above, forces which are applied to the side surface sections 46a, 47a, 48a and 49a when a load is applied do not concentrate on one point, and therefore breakage hardly occurs in the sections.

In the annular spring 40 of the present embodiment which is configured as described above, the length in the axial direction and the radius can be made smaller, and the weight can be also reduced similarly to the annular spring 10 in the first embodiment, the annular spring 20 in the second embodiment and the annular spring 30 in the third embodiment, as compared with a case where an elastic section in which bending stress and torsional stress occur is used as the elastic section. Further, a deviation of the centers, and hysteresis hardly occur, and therefore, when sensing is performed by using a strain sensor or the like, reliability thereof is high.

Further, in the annular spring 40 of the present embodiment, the inner circumferential section 42 can be configured as a torsion bar, similarly to the annular spring 20 in the second embodiment and the annular spring 30 in the third embodiment. Further, in the inner circumferential section 42, an elastic section and a connection section for connecting to the elastic section are not provided on the inner circumferential surface, and therefore, a strain sensor or the like can be easily stuck thereon.

Furthermore, since the annular spring 40 in the present embodiment has a multilayer structure formed of the two annular springs, the annular spring 40 can be displaced to a larger degree than the annular spring 10 in the first embodiment and the annular spring 20 in the second embodiment, and therefore easily absorbs an impact.

Furthermore, in the annular spring 40 in the present embodiment, an inside diameter can be made larger or an outside diameter can be made smaller, as compared with the inside diameter or the outside diameter of the annular spring 30 in the third embodiment.

Further, when the sensor S for detecting a strain amount is stuck onto the annular spring 40, a plurality of sensors are preferably stuck to be equidistant in a circumferential direction, at substantially midpoint positions between the one end side outer circumferential section 41 and the other end side outer circumferential section 43, on the inner circumferential surface of the inner circumferential section 42. Further, the positions are preferably at substantially midpoint positions between the adjacent first inner circumferential side connecting sections 46. This is because the positions are locations that easily bend to a large degree when a load is applied to the annular spring 40, and therefore, the strain amount can be detected with high precision.

Fifth Embodiment

Next, as a fifth embodiment of the present invention, a torque detecting device and a robot joint mechanism that use the annular springs in the first to the fourth embodiments will be described. The present embodiment is used in a robot as follows, for example.

Figure 10:
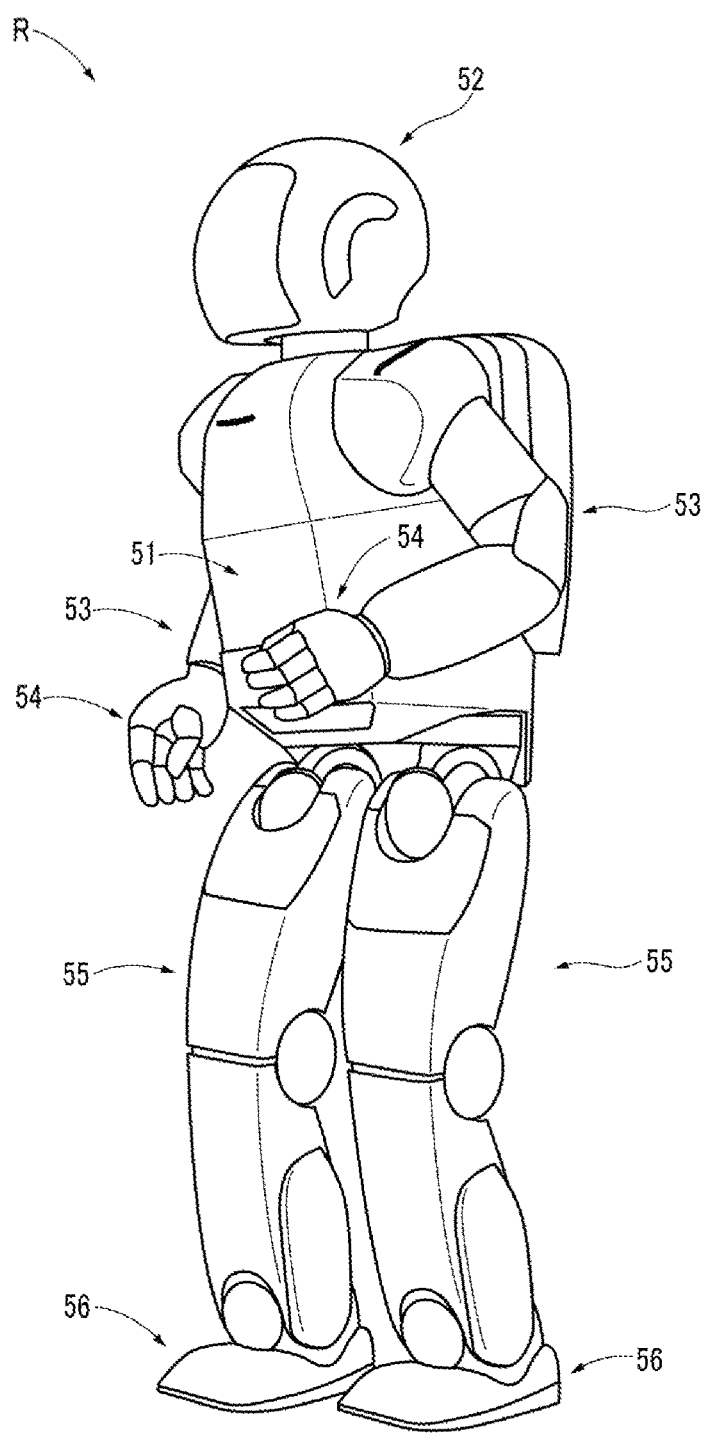
FIG. 10 is a schematic view showing a configuration of a robot comprising a torque detecting device and a robot joint mechanism according to a fifth embodiment of the present invention.

As shown in FIG. 10, a robot R comprises a base body 51 that is a trunk, a head section 52 that is provided at an upper portion of the base body 51, left and right arm bodies 53 that are provided extendedly from both left and right sides of the upper portion of the base body 51, hand sections 54 that are provided at tip end portions of the arm bodies 53, left and right leg bodies 55 that are provided extendedly downward from a lower portion of the base body 51, and foot sections 56 that are attached to tip end portions of the leg bodies 55, similarly to a human being.

The robot R can perform bending and stretching movements of the arm bodies and the leg bodies in a plurality of joint mechanisms corresponding to joints of a human being such as shoulder joints, elbow joints, wrist joints, hip joints, knee joints and ankle joints.

As shown in FIG. 11, the joint mechanism which is incorporated in the arm body 53 of the robot R comprises a base link 53a to be a base body of the front arm section of the arm body 53, a link mechanism 53b that is disposed between the base link 53a and the hand section 54, and laterally waves or vertically waves the hand section 54, an actuator 53c (a drive source) that is disposed inside the base link 53a, a pair of left and right strain wave gearings 53d that are disposed inside the base link 53a, and reduces the drive force from the actuator 53c and transmits the drive force, drive arms 53e that extend from the respective strain wave gearings 53d, and a pair of connecting rods 53f that are connected to the drive arms 53e and the link mechanism 53b.

By the joint mechanism which is configured as above, the hand section 54 of the robot R is waved vertically when the pair of left and right connecting rods 53f move in the same direction along a longitudinal direction of the base link 53a, and is waved laterally when the pair of left and right connecting rods 53f move to be in relatively opposite directions.

The strain wave gearing 53d has a circular spline where a tooth section is formed on an inner circumferential surface, and a flex spline where a tooth section that is meshed with the tooth section of the circular spline is formed on an outer circumferential surface. The tooth section of the circular spline is provided on the inner circumferential surface of the inner circumferential section of the annular spring shown in each of the above described embodiments. Further, the drive arm 53e of the strain wave gearing 53d is connected to the outer circumferential section of the annular spring which is shown in each of the above described embodiments.

Consequently, a drive force that is transmitted from the actuator 53c to the strain wave gearing 53d is transmitted to the drive arm 53e through the annular spring, and moves the connecting rod 53f.

The joint mechanism which is configured as above is compacter and lighter in weight as compared with the robot joint mechanism using the conventional annular spring. When the arm body 53 and the hand section 54 collide with an obstacle or the like and receive an impact, the annular spring absorbs the impact.

Further, the sensors which detect strain amounts of the inner circumferential surface or the outer circumferential surface are stuck on the outer circumferential section or the inner circumferential section of the annular spring which is used in the strain wave gearing 53d. The displacement amount of the outer circumferential section or the inner circumferential section is a sufficient amount to detect the strain amount, and therefore, torque detection with high precision is enabled by calculating the rotational drive force (torque) based on the detection value.

Note that the sensors may be stuck onto the elastic section, besides the outer circumferential section or the inner circumferential section of the annular spring. Further, when the inner circumferential section is a tubular member, the sensors may be stuck onto the inner circumferential surface or the outer circumferential surface of the inner circumferential section.

Other Embodiments

The forgoing is the explanation of the illustrated embodiments, but the present invention is not limited to the embodiments as above.

For example, in the above described embodiments, the respective sections of the annular spring are integrally configured, but the respective sections may be configured as separate pieces and connected by welding or the like.

Further, in each of the above described first to fourth embodiments, the elastic section and the outer circumferential section and the inner circumferential section are integrally formed, but the elastic section and only the outer circumferential section may be integrally formed, or the elastic section and only the inner circumferential section may be integrally formed.

Further, in each of the above described first to fourth embodiments, the elastic section is formed as the plate-shaped member, but the elastic section can be in such a shape as to be a beam between the inner circumferential section and the outer circumferential section, and may be in a columnar shape, for example.

Further, as the third embodiment and the fourth embodiment, the annular spring of the multistage structure and the annular spring of the multilayer structure in which the two annular spring are combined are explained, but the present invention may be the ring-spring in which a larger number of annular springs are combined.

Further, in the above described fifth embodiment, the case where the annular springs in the first to the fourth embodiments are used in the joint mechanism and the torque detecting device in the front arm section of the robot R is described. However, the torque detecting device and the robot joint mechanism that use the annular spring of the present invention not only can be used in the joint mechanism of the wrist section, but also may be applied to the joint mechanisms of the other sections of the robot. Further, the torque detecting device and the robot joint mechanism may be used in a drive force transmission system of an automobile or the like, a working robot and the like as well as a bipedal walking robot as illustrated.

Further, in the above described fifth embodiment, the strain wave gearing 53d which is a reduction mechanism is connected to the inner circumferential section of the annular spring, but may be connected to the outer circumferential section.

Further, in the fifth embodiment, the configuration in which the annular spring and the strain wave gearing are combined is explained, but the present invention is not limited to the mode like this. For example, in place of the strain wave gearing, the other reduction mechanism such as a planetary gear mechanism may be used.

Further, in the above described embodiment, the six sets of elastic sections are included, but the present invention is not limited to the configuration like this, and may have at least one set of elastic sections.

Further, in the above described third embodiment and fourth embodiment, the positions of the elastic sections of the two annular springs are configured to be of the same phase seen from the axial direction. However, when the annular spring is configured to have a multistage structure or a multilayer structure, the phases of the positions of the elastic sections of the annular springs may be shifted from one another.

REFERENCE SIGNS LIST 10, 20, 30, 40 Annular spring
11, 21, 31 Outer circumferential section
11a, 12a, 21a, 22d, 31a, 33a, 41a, 43a Hole
12, 22, 42 Inner circumferential section
13, 23 Elastic section
13a, 23a, 34a, 35a, 44a, 45a First elastic section
13b, 23b, 34b, 35b, 44b, 45b Second elastic section
14, 24 Inner circumferential side connecting section 14a, 15a, 24a, 25a, 36a, 37a, 38a, 39a, 46a, 47a, 48a, 49a Side surface section
15, 25 Outer circumferential side connecting section
22a, 32a First annular section
22b, 32b Tubular section
22c, 32c Second annular section
26 Connection member
32 First inner circumferential section
33 Second inner circumferential section
34 Outer circumferential side elastic section
35 Inner circumferential side elastic section
36, 46 First inner circumferential side connecting section
37, 47 First outer circumferential side connecting section
38, 48 Second inner circumferential side connecting section
3, 49 Second outer circumferential side connecting section
41 One end side outer circumferential section
43 Other end side outer circumferential section
44 One end side elastic section
45 Other end side elastic section
51 Base body
52 Head section
53 Arm body
53a Base link
53b Link mechanism
53c Actuator (drive source)
53d Strain wave gearing
53e Drive arm
53f Connecting rod
54 Hand section
55 Leg body
56 Foot section
P1 Center point
P2, P3, P4, P5 Connection point
R Robot
S Sensor

What is claimed is:

1. An annular spring comprising:
an annular outer circumferential section;
an annular inner circumferential section that is disposed on an inner circumferential side of the outer circumferential section; and
an even number of elastic sections that are disposed between the outer circumferential section and the inner circumferential section,
wherein each elastic section is configured by
a first elastic section that has one end connected to an outer circumferential surface of the inner circumferential section, and another end connected to an inner circumferential surface of the outer circumferential section, and a second elastic section that has one end connected to the outer circumferential surface of the inner circumferential section, and another end connected to the inner circumferential surface of the outer circumferential section, and is symmetrical to the first elastic section about a symmetry line that passes through a center point of the inner circumferential section and a connection point of the first elastic section, the second elastic section, and the inner circumferential section,
the first elastic section and the second elastic section are configured to elastically deform so that one of the first elastic section and the second elastic section is compressed and the other one is stretched, when one of the outer circumferential section and the inner circumferential section rotates relative to the other, and
a first point, a second point, and a third point are provided along a same straight line, the first point being at a connection point of the first elastic section and the outer circumferential section, the second point being at the connection point of the first elastic section, the second elastic section, and the inner circumferential section, and the third point being at a connection point of the second elastic section and the outer circumferential section.

2. The annular spring according to claim 1,
wherein the outer circumferential section or the inner circumferential section has connection sections that are connected to the elastic sections,
the elastic sections and the outer circumferential section or the inner circumferential section are integrally formed, and
a section of each of the connection sections, which is sandwiched by a connected one of the elastic sections and the inner circumferential surface of the outer circumferential section or the outer circumferential surface of the inner circumferential section is in a shape that is recessed as an arc shape toward a side of a connection point of said connected one of the elastic sections and the outer circumferential section or the inner circumferential section.

3. The annular spring according to claim 1,
wherein the straight line, along which the first point, the second point, and the third point are provided, extends along a line tangential to the outer circumferential surface of the inner circumferential section at the second point.

4. The annular spring according to claim 1,
wherein the inner circumferential section is a first inner circumferential section, the elastic sections which are disposed between the inner circumferential section, as the first inner circumferential section, and the outer circumferential section are outer circumferential side elastic sections, the first elastic section is an outer circumferential side first elastic section, and the second elastic section is an outer circumferential side second elastic section,
the annular spring further comprising:
an annular second inner circumferential section that is disposed on an inner circumferential side of the first inner circumferential section; and
an even number of inner circumferential side elastic sections that are disposed between the first inner circumferential section and the second inner circumferential section,
wherein each inner circumferential side elastic section is configured by
an inner circumferential side first elastic section that has one end connected to an outer circumferential surface of the second inner circumferential section, and another end connected to an inner circumferential surface of the first inner circumferential section, and an inner circumferential side second elastic section that has one end connected to the outer circumferential surface of the second inner circumferential section, and another end connected to the inner circumferential surface of the first inner circumferential section, and is symmetrical to the inner circumferential side first elastic section about a second symmetry line that passes through a center point of the second inner circumferential section and a connection point of the inner circumferential side first elastic section, the inner circumferential side second elastic section, and the second inner circumferential section, the inner circumferential side first elastic section and the inner circumferential side second elastic section are configured to elastically deform so that one of the inner circumferential side first elastic section and the inner circumferential side second elastic section is compressed and the other one is stretched, when one of the first inner circumferential section and the second inner circumferential section rotates relative to the other, and a fourth point, a fifth point, and a sixth point are provided along a same second straight line, the fourth point being at a connection point of the inner circumferential side first elastic section and the first inner circumferential section, the fifth point being at the connection point of the inner circumferential side first elastic section, the inner circumferential side second elastic section, and the second inner circumferential section, and the sixth point being at a connection point of the inner circumferential side second elastic section and the first inner circumferential section.

5. The annular spring according to claim 4, wherein the first inner circumferential section is a tubular member, and the outer circumferential section and the second inner circumferential section are provided in positions that are shifted in an axial direction.

6. The annular spring according to claim 1, wherein the inner circumferential section is a tubular member, the annular spring has a plurality of the outer circumferential section that are disposed in positions that are shifted in an axial direction, on an outer circumferential side of the inner circumferential section, and the elastic sections are respectively provided between the inner circumferential section and respective outer circumferential sections.

7. A torque detecting device, comprising:
an annular spring; and
a sensor that detects a strain amount of the annular spring,
wherein the annular spring comprises
an annular outer circumferential section, an annular inner circumferential section that is disposed on an inner circumferential side of the outer circumferential section, and
an even number of elastic sections that are disposed between the outer circumferential section and the inner circumferential section,
wherein
each elastic section is configured by
a first elastic section that has one end connected to an outer circumferential surface of the inner circumferential section, and another end connected to an inner circumferential surface of the outer circumferential section, and a second elastic section that has one end connected to the outer circumferential surface of the inner circumferential section, and another end connected to the inner circumferential surface of the outer circumferential section, and is symmetrical to the first elastic section about a symmetry line that passes through a center point of the inner circumferential section and a connection point of the first elastic section, the second elastic section, and the inner circumferential section, the first elastic section and the second elastic section are configured to deform so that one of the first elastic section and the second elastic section is compressed, and the other one is stretched, when one of the outer circumferential section and the inner circumferential section rotates relative to the other, and a first point, a second point, and a third point are provided along a same straight line, the first point being at a connection point of the first elastic section and the outer circumferential section, the second point being at the connection point of the first elastic section, the second elastic section, and the inner circumferential section, and the third point being at a connection point of the second elastic section and the outer circumferential section, and the sensor is stuck on the outer circumferential section or the inner circumferential section, and detects a strain amount of the outer circumferential section or the inner circumferential section.

8. A torque detecting device, comprising:
an annular spring; and
a sensor that detects a strain amount of the annular spring,
wherein the annular spring comprises
an annular outer circumferential section, an annular inner circumferential section that is disposed on an inner circumferential side of the outer circumferential section, and an even number of elastic sections that are disposed between the outer circumferential section and the inner circumferential section,
wherein
each elastic section is configured by
a first elastic section that has one end connected to an outer circumferential surface of the inner circumferential section, and another end connected to an inner circumferential surface of the outer circumferential section, and a second elastic section that has one end connected to the outer circumferential surface of the inner circumferential section, and another end connected to the inner circumferential surface of the outer circumferential section, and is symmetrical to the first elastic section about a symmetry line that passes through a center point of the inner circumferential section and a connection point of the first elastic section, the second elastic section, and the inner circumferential section, the first elastic section and the second elastic section are configured to deform so that one of the first elastic section and the second elastic section is compressed and the other one is stretched, when one of the outer circumferential section and the inner circumferential section rotates relative to the other, and a first point, a second point, and a third point are provided along a same straight line, the first point being at a connection point of the first elastic section and the outer circumferential section, the second point being at the connection point of the first elastic section, the second elastic section, and the inner circumferential section, and the third point being at a connection point of the second elastic section and the outer circumferential section, and the sensor is stuck on the elastic section, and detects a strain amount of the elastic section.

9. A torque detecting device, comprising:
an annular spring; and
a sensor that detects a strain amount of the annular spring, wherein the annular spring comprises
an annular outer circumferential section, an annular first inner circumferential section that is disposed on an inner circumferential side of the outer circumferential section, an even number of outer circumferential side elastic sections that are disposed between the outer circumferential section and the first inner circumferential section, an annular second inner circumferential section that is disposed on an inner circumferential side of the first inner circumferential section, and an even number of inner circumferential side elastic sections that are disposed between the first inner circumferential section and the second inner circumferential section,
wherein
each outer circumferential elastic section is configured by
an outer circumferential side first elastic section that has one end connected to an outer circumferential surface of the first inner circumferential section, and another end connected to an inner circumferential surface of the outer circumferential section, and an outer circumferential side second elastic section that has one end connected to the outer circumferential surface of the first inner circumferential section and another end connected to the inner circumferential surface of the outer circumferential section, and is symmetrical to the outer circumferential side first elastic section about a first symmetry line that passes through a center point of the first inner circumferential section and a connection point of the outer circumferential side first elastic section, the outer circumferential side second elastic element, and the first inner circumferential section,
the outer circumferential side first elastic section and the outer circumferential side second elastic section are configured to elastically deform so that one of the outer circumferential side first elastic section and the outer circumferential side second elastic section is compressed and the other one is stretched, when one of the outer circumferential section and the first inner circumferential section rotates relative to the other, and
a first point, a second point, and a third point are provided along a same first straight line, the first point being at a connection point of the outer circumferential side first elastic section and the outer circumferential section, the second point being at the connection point of the outer circumferential side first elastic section, the outer circumferential side second elastic section, and the first inner circumferential section, and the third point being at a connection point of the outer circumferential side second elastic section and the outer circumferential section,
each inner circumferential side elastic section is configured by
an inner circumferential side first elastic section that has one end connected to an outer circumferential surface of the second inner circumferential section, and another end connected to an inner circumferential surface of the first inner circumferential section, and an inner circumferential side second elastic section that has one end connected to the outer circumferential surface of the second inner circumferential section and another end connected to the inner circumferential surface of the first inner circumferential section, and is symmetrical to the inner circumferential side first elastic section about a second symmetry line that passes through a center point of the second inner circumferential section and a connection point of the inner circumferential side first elastic section, the inner circumferential side second elastic section, and the second inner circumferential section,
the inner circumferential side first elastic section and the inner circumferential side second elastic section are configured to elastically deform so that one of the inner circumferential side first elastic section and the inner circumferential side second elastic section is compressed and the other one is stretched, when one of the first inner circumferential section and the second inner circumferential section rotates relative to the other, and
a fourth point, a fifth point, and a sixth point are provided along a same second straight line, the fourth point being at a connection point of the inner circumferential side first elastic section and the first inner circumferential section, the fifth point being at the connection point of the inner circumferential side first elastic section, the inner circumferential side second elastic section, and the second inner circumferential section, and the sixth point being at a connection point of the inner circumferential side second elastic section and the first inner circumferential section,
the first inner circumferential section is a tubular member,
the outer circumferential section and the second inner circumferential section are provided in positions that are shifted in an axial direction, and
the sensor is stuck on the outer circumferential surface or the inner circumferential surface of the first inner circumferential section, and detects a strain amount of the first inner circumferential section.

10. A torque detecting device, comprising:
an annular spring; and
a sensor that detects a strain amount of the annular spring,
wherein the annular spring comprises
an annular outer circumferential section, an annular inner circumferential section that is disposed on an inner circumferential side of the outer circumferential section, and an even number of elastic sections that are disposed between the outer circumferential section and the inner circumferential section,
wherein
each elastic section is configured by
a first elastic section that has one end connected to an outer circumferential surface of the inner circumferential section, and another end connected to an inner circumferential surface of the outer circumferential section, and a second elastic section that has one end connected to the outer circumferential surface of the inner circumferential section, and another end connected to the inner circumferential surface of the outer circumferential section, and is symmetrical to the first elastic section about a symmetry line that passes through a center point of the inner circumferential section and a connection point of the first elastic section, the second elastic section, and the inner circumferential section,
the first elastic section and the second elastic section are configured to deform so that one of the first elastic section and the second elastic section is compressed and the other one is stretched, when one of the outer circumferential section and the inner circumferential section rotates relative to the other, and a first point, a second point, and a third point are provided along a same straight line, the first point being at a connection point of the first elastic section and the outer circumferential section, the second point being at the connection point of the first elastic section, the second elastic section, and the inner circumferential section, and the third point being at a connection point of the second elastic section and the outer circumferential section, the inner circumferential section is a tubular member, the annular spring has a plurality of the outer circumferential section that are disposed in positions that are shifted in an axial direction, on an outer circumferential side of the inner circumferential section, the sections are respectively provided between the inner circumferential section and respective outer circumferential sections, and the sensor is stuck on the outer circumferential surface or the inner circumferential surface of the inner circumferential section, and detects a strain amount of the inner circumferential section.

11. A robot joint mechanism comprising:

an annular spring;

a drive source; and a reduction mechanism that reduces a drive force from the drive source and transmits the drive force to the annular spring, wherein the annular spring comprises an annular outer circumferential section, an annular inner circumferential section that is disposed on an inner circumferential side of the outer circumferential section, and an even number of elastic sections that are disposed between the outer circumferential section and the inner circumferential section, wherein each elastic section is configured by a first elastic section that has one end connected to an outer circumferential surface of the inner circumferential section, and another end connected to an inner circumferential surface of the outer circumferential section, and a second elastic section that has one end connected to the outer circumferential surface of the inner circumferential section, and another end connected to the inner circumferential surface of the outer circumferential section, and is symmetrical to the first elastic section about a symmetry line that passes through a center point of the inner circumferential section and a connection point of the first elastic section, the second elastic section, and the inner circumferential section, the first elastic section and the second elastic section are configured to elastically deform so that one of the first elastic section and the second elastic section is compressed and the other one is stretched, when one of the outer circumferential section and the inner circumferential section rotates relative to the other, and a first point, a second point, and a third point are provided along a same straight line, the first point being at a connection point of the first elastic section and the outer circumferential section, the second point being at the connection point of the first elastic section, the second elastic section, and the inner circumferential section, and the third point being at a connection point of the second elastic section and the outer circumferential section, and the reduction mechanism reduces the drive force from the drive source and transmits the drive force to the outer circumferential section or the inner circumferential section of the annular spring.

12. The robot joint mechanism according to claim 11, wherein the reduction mechanism is a strain wave gearing that has a circular spline where a tooth section is formed on an inner circumferential surface, and a flex spline where a tooth section that is meshed with the tooth section of the circular spline is formed on an outer circumferential surface, and the tooth section of the circular spline is provided at the inner circumferential section of the annular spring.

* * * * *